(12) United States Patent
Suzuki et al.

(10) Patent No.: US 11,926,125 B2
(45) Date of Patent: Mar. 12, 2024

(54) COLORED RESIN PARTICLE DISPERSION, INK, INK SET, INKJET PRINTING METHOD, AND METHOD OF MANUFACTURING COLORED RESIN PARTICLE DISPERSION

(71) Applicant: FUJIFILM Corporation, Tokyo (JP)

(72) Inventors: Shota Suzuki, Kanagawa (JP); Noriaki Sato, Kanagawa (JP); Naoka Hamada, Kanagawa (JP); Ryoichi Nakano, Kanagawa (JP); Masao Ikoshi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 616 days.

(21) Appl. No.: 17/152,811

(22) Filed: Jan. 20, 2021

(65) Prior Publication Data

US 2021/0138776 A1 May 13, 2021

Related U.S. Application Data

(63) Continuation of application No. PCT/JP2019/028338, filed on Jul. 18, 2019.

(30) Foreign Application Priority Data

Jul. 27, 2018 (JP) ................................. 2018-141895
Feb. 28, 2019 (JP) ................................. 2019-036273

(51) Int. Cl.
| | | |
|---|---|---|
| B32B 27/30 | (2006.01) | |
| B32B 27/08 | (2006.01) | |
| B41J 2/01 | (2006.01) | |
| C09D 11/322 | (2014.01) | |
| C09D 11/328 | (2014.01) | |
| C09D 11/40 | (2014.01) | |

(52) U.S. Cl.
CPC ............. *B32B 27/30* (2013.01); *B32B 27/08* (2013.01); *B41J 2/01* (2013.01); *C09D 11/322* (2013.01); *C09D 11/328* (2013.01); *C09D 11/40* (2013.01)

(58) Field of Classification Search
CPC ....... B32B 27/30; B32B 27/08; C09D 11/322; C09D 11/40
USPC ....................................................... 523/160
See application file for complete search history.

(56) References Cited

U.S. PATENT DOCUMENTS

| | | |
|---|---|---|
| 6,214,963 B1 | 4/2001 | Noguchi et al. |
| 6,632,858 B1 | 10/2003 | Pears et al. |
| 2001/0001103 A1 | 5/2001 | Noguchi et al. |
| 2011/0293898 A1 | 12/2011 | Yatake et al. |
| 2015/0217576 A1 | 8/2015 | Yatake et al. |
| 2018/0327619 A1 | 11/2018 | Fujie et al. |
| 2019/0169453 A1 | 6/2019 | Sato et al. |

FOREIGN PATENT DOCUMENTS

| | | |
|---|---|---|
| CN | 102261001 | 11/2011 |
| EP | 2933374 | 10/2015 |
| JP | H10168151 | 6/1998 |
| JP | 2002509957 | 4/2002 |
| JP | 2003055886 | 2/2003 |
| JP | 2004075920 | 3/2004 |
| JP | 2008069203 | 3/2008 |
| JP | 2012007148 | 1/2012 |
| WO | 2017131107 | 8/2017 |
| WO | 2018042916 | 3/2018 |
| WO | WO-2018042916 A1 * | 3/2018 ......... C08G 18/0823 |

OTHER PUBLICATIONS

"Office Action of India Counterpart Application", dated Apr. 1, 2021, p. 1-p. 6.
"Office Action of India Counterpart Application" with English translation thereof, dated Sep. 3, 2021, p. 1-p. 2.
"International Search Report (Form PCT/ISA/210) of PCT/JP2019/028338," dated Oct. 15, 2019, with English translation thereof, pp. 1-5.
"Written Opinion of the International Searching Authority (Form PCT/ISA/237) of PCT/JP2019/028338," dated Oct. 15, 2019, with English translation thereof, pp. 1-12.
"Office Action of China Counterpart Application" with English translation thereof, dated Mar. 14, 2022, p. 1-p. 28.
"Office Action of China Counterpart Application" with English translation thereof, dated Sep. 14, 2022, p. 1-p. 30.

(Continued)

*Primary Examiner* — Deve V Hall

(74) *Attorney, Agent, or Firm* — JCIPRNET

(57) ABSTRACT

Provided are a colored resin particle dispersion containing colored resin particles and water, in which the colored resin particles contain a water-insoluble chain polymer and at least one dye selected from the group consisting of an oil-soluble dye, a disperse dye and a vat dye, and the water-insoluble chain polymer has a structure represented by the following General Formula (G), a cyclic structure, and a hydrophilic group, an ink manufactured using the colored resin particle dispersion, an ink set having the ink, an inkjet printing method using the ink, and a method of manufacturing the colored resin particle dispersion.

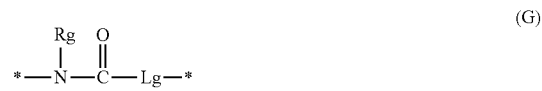

(G)

In the General Formula (G), Rg represents a hydrogen atom or a substituent, Lg represents —O—, —S—, or —NRz-, Rz represents a hydrogen atom or a substituent, and * represents a bonding position.

20 Claims, No Drawings

(56) References Cited

OTHER PUBLICATIONS

"Office Action of India Counterpart Application" with English translation thereof, dated Nov. 15, 2021, p. 1-p. 2.
"Office Action of Japan Counterpart Application" with English translation thereof, dated Nov. 30, 2021, p. 1-p. 5.

* cited by examiner

COLORED RESIN PARTICLE DISPERSION, INK, INK SET, INKJET PRINTING METHOD, AND METHOD OF MANUFACTURING COLORED RESIN PARTICLE DISPERSION

CROSS REFERENCE TO RELATED APPLICATION

This is a continuation of International Application No. PCT/JP2019/028338 filed on Jul. 18, 2019, and claims priorities from Japanese Patent Application No. 2018-141895 filed on Jul. 27, 2018, Japanese Patent Application No. 2019-036273 filed on Feb. 28, 2019, the entire disclosures of which are incorporated herein by reference.

BACKGROUND OF THE INVENTION

1. Field of the Invention

The present invention relates to a colored resin particle dispersion, an ink, an ink set, and an inkjet printing method.

2. Description of the Related Art

An inkjet ink is an ink which can be applied to an inkjet method, and is widely used for various purposes. For example, inkjet printing does not need to produce a plate and is capable of quickly forming an image with excellent gradation. Furthermore, the inkjet printing can be said to be an excellent printing method having an environmental advantage such as a small amount of waste liquid because it uses only a necessary amount of ink for an image to be formed.

EP2933374B and JP2008-069203A describe an ink containing an aqueous medium and particles having a core-shell structure in which a core is composed of a dye and a shell is composed of a polymer having a crosslinking structure.

JP1998-168151A (JP-H10-168151A) describes an ink containing a disperse dye, a water-soluble urethane polymer as a dispersion medium for the disperse dye, and water.

SUMMARY OF THE INVENTION

However, it has been found by the studies performed by the inventors that the inks described in EP2933374B and JP2008-069203A are not sufficient in color developability of a colored fabric obtained by applying the ink to inkjet printing and in storage stability.

An object of the present invention is to provide: a colored resin particle dispersion which can be used to manufacture an ink which is capable of forming, on a fabric, an image having excellent color developability, washing resistance, perspiration resistance, rub resistance, and dry cleaning resistance, and on a plastic base material, an image having excellent color developability, pencil hardness, and adhesiveness to the base material, and has excellent jetting stability and storage stability; an ink manufactured using the colored resin particle dispersion; an ink set having the ink; an inkjet printing method using the ink; and a method of manufacturing the colored resin particle dispersion.

The inventors have conducted extensive studies, and found that the object can be achieved by using colored resin particles containing a specific water-insoluble chain polymer (a water-insoluble chain polymer having a structure represented by Formula (G), a cyclic structure, and a hydrophilic group) and a specific dye (at least one dye selected from the group consisting of an oil-soluble dye, a disperse dye, and a vat dye). That is, the present invention has the following configurations.

<1>
A colored resin particle dispersion comprising: colored resin particles; and water,
in which the colored resin particles contain a water-insoluble chain polymer and at least one dye selected from the group consisting of an oil-soluble dye, a disperse dye and a vat dye, and
the water-insoluble chain polymer has a structure represented by the following General Formula (G), a cyclic structure, and a hydrophilic group.

In the General Formula (G), Rg represents a hydrogen atom or a substituent, and Lg represents —O—, —S—, or —NRz-. Rz represents a hydrogen atom or a substituent. * represents a bonding position.

<2>
The colored resin particle dispersion according to <1>, in which the water-insoluble chain polymer has at least one structural unit selected from a structural unit represented by the following General Formula (1) and a structural unit represented by the following General Formula (2).

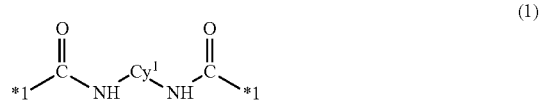

In the General Formulae (1) and (2),
$Cy^1$ and $Cy^2$ each independently represent a divalent organic group containing a cyclic structure,
$Y^1$ and $Y^2$ each independently represent —O—, —S—, or —NRz-, and
Rz represents a hydrogen atom or a substituent.
*1 and *2 each represent a bonding position.

<3>
The colored resin particle dispersion according to <2>, in which the water-insoluble chain polymer has both the structural unit represented by the General Formula (1) and the structural unit represented by the General Formula (2).

<4>
The colored resin particle dispersion according to <2>, in which a total amount of at least one kind of the structural unit selected from the group consisting of the structural unit represented by the General Formula (1) and the structural unit represented by the General Formula (2) is 15 mass % or greater with respect to a total amount of the water-insoluble chain polymer.

<5>
The colored resin particle dispersion according to <1>, in which a total amount of substance of the cyclic structure in 1 g of the water-insoluble chain polymer is 0.7 mmol/g or greater.

<6>

The colored resin particle dispersion according to <2>, in which at least one of $Cy^1$ or $Cy^2$ contains three or more rings.

<7>

The colored resin particle dispersion according to <1>, in which the water-insoluble chain polymer has a polymerizable group.

<8>

The colored resin particle dispersion according to <1>, in which the hydrophilic group is at least one selected from the group consisting of a carboxyl group and a salt of a carboxyl group.

<9>

The colored resin particle dispersion according to <8>, in which a total amount of substance of the carboxyl group and the salt of the carboxyl group in 1 g of the water-insoluble chain polymer is 0.30 mmol/g to 1.50 mmol/g.

<10>

The colored resin particle dispersion according to <1>, in which a weight-average molecular weight of the water-insoluble chain polymer is 5,000 to 100,000.

<11>

The colored resin particle dispersion according to <1>, in which the dye is the oil-soluble dye.

<12>

The colored resin particle dispersion according to <11>, in which the oil-soluble dye has two azo groups.

<13>

The colored resin particle dispersion according to <11>, in which the oil-soluble dye contains a metal complex or a compound represented by the following General Formula (M-A).

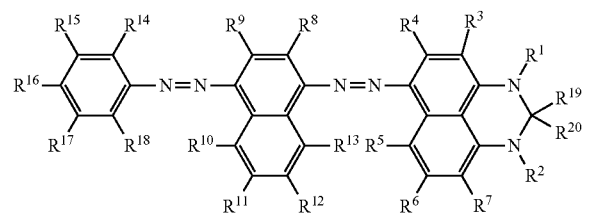

(M-A)

In the General Formula (M-A), $R^1$ to $R^{20}$ each independently represent a hydrogen atom or a substituent.

<14>

The colored resin particle dispersion according to <13>, in which the oil-soluble dye contains chromium.

<15>

The colored resin particle dispersion according to <1>, in which a mass ratio of a content of the water-insoluble chain polymer to a content of the dye is 0.1 to 2.5.

<16>

The colored resin particle dispersion according to <1>, in which the mass ratio of the content of the water-insoluble chain polymer to the content of the dye is 0.25 to 1.

<17>

The colored resin particle dispersion according to <1>, in which the colored resin particles contain an oily organic solvent.

<18>

The colored resin particle dispersion according to <17>, in which a boiling point of the oily organic solvent is 180° C. or higher.

<19>

An ink comprising: the colored resin particle dispersion according to <1>.

<20>

The ink according to <19>, further comprising: a pigment.

<21>

The ink according to <19>, in which the ink is an inkjet ink.

<22>

The ink according to <19>, in which the ink is a printing ink.

<23>

An ink set comprising: a black ink; a yellow ink; a magenta ink; and a cyan ink, in which at least one ink of the ink set is the ink according to <19>.

<24>

An ink set comprising: a black ink, a yellow ink, a magenta ink, and a cyan ink, in which the black ink is the ink according to <19>.

<25>

An inkjet printing method comprising: a step of printing the ink according to <19> on a fabric by an inkjet method.

<26>

The inkjet printing method according to <25>, in which the fabric includes at least one selected from cotton and polyester.

<27>

The inkjet printing method according to <25>, in which the fabric is a fabric pretreated with an aqueous pretreatment liquid containing a coagulating agent.

<28>

The inkjet printing method according to <25>, further comprising: a heat treatment step.

<29>

A method of manufacturing a colored resin particle dispersion containing colored resin particles and water, the colored resin particles containing a water-insoluble chain polymer and at least one dye selected from the group consisting of an oil-soluble dye, a disperse dye and a vat dye, the water-insoluble chain polymer having a structure represented by the following General Formula (G), a cyclic structure, and a hydrophilic group, and the method comprising:

a step (1); and a step (2).

Step (1): a step of obtaining an emulsion by emulsifying a mixture containing water, an organic solvent, a water-insoluble chain polymer having a structure represented by the General Formula (G), a cyclic structure and a hydrophilic group, and at least one dye selected from the group consisting of an oil-soluble dye, a disperse dye and a vat dye.

Step (2): a step of removing the organic solvent from the emulsion obtained in the step (1).

A mass ratio of a content of the water-insoluble chain polymer to a content of the dye in the mixture of the step (1) is 0.1 to 2.5.

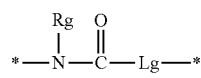

(G)

In the General Formula (G), Rg represents a hydrogen atom or a substituent, and Lg represents —O—, —S—, or —NRz-. Rz represents a hydrogen atom or a substituent. * represents a bonding position.

According to the present invention, it is possible to provide: a colored resin particle dispersion which can be used to manufacture an ink which is capable of forming, on a fabric, an image having excellent color developability, washing resistance, perspiration resistance, rub resistance, and dry cleaning resistance, and on a plastic base material, an image having excellent color developability, pencil hardness, and adhesiveness to the base material, and has excellent jetting stability and storage stability; an ink manufactured using the colored resin particle dispersion; an ink set having the ink; an inkjet printing method using the ink; and a method of manufacturing the colored resin particle dispersion.

DESCRIPTION OF THE PREFERRED EMBODIMENTS

Hereinafter, the present invention will be described in detail.

In this specification, a numerical value range expressed using "to" means a range including numerical values before and after "to" as a lower limit value and an upper limit value.

In this specification, the term "image" means all films formed by an ink, and includes not only pattern images (for example, letters, symbols, or figures) but also solid images.

In this specification, the term "(meth)acrylate" represents at least one of acrylate or methacrylate, the term "(meth)acryl" represents at least one of acryl or methacryl, and the term "(meth)acryloyl" means at least one of acryloyl or methacryloyl.

In this specification, a "substituent group A" refers to the substituents described in 0117 in WO2017/131107A.

In this specification, a substituent group A1 includes the following substituents.

(Substituent Group A1)

A halogen atom, an alkyl group (preferably having 1 to 30 carbon atoms), a cycloalkyl group (preferably having 3 to 30 carbon atoms), an aryl group (preferably having 6 to 30 carbon atoms), a heterocyclic group (preferably having 3 to 30 carbon atoms), an acyl group (preferably having 2 to 30 carbon atoms), a hydroxyl group, a carboxyl group, a sulfo group, a cyano group, a nitro group, an alkoxy group (preferably having 1 to 30 carbon atoms), an aryloxy group (preferably having 6 to 30 carbon atoms), an acyloxy group (preferably having 2 to 30 carbon atoms), an alkoxycarbonyl group (preferably having 2 to 30 carbon atoms), an aryloxycarbonyl group (preferably having 7 to 30 carbon atoms), a carbamoyl group, a sulfamoyl group, an alkylsulfonyl group (preferably having 1 to 30 carbon atoms), an arylsulfonyl group (preferably having 6 to 30 carbon atoms), an amino group, an acylamino group (preferably having 1 to 30 carbon atoms), an alkylsulfonylamino group (preferably having 1 to 30 carbon atoms), an arylsulfonylamino group (preferably having 6 to 30 carbon atoms), and substituents obtained by combining two or more thereof.

[Colored Resin Particle Dispersion]

A colored resin particle dispersion according to the embodiment of the present invention is a colored resin particle dispersion containing colored resin particles and water.

The colored resin particles contain a water-insoluble chain polymer and at least one dye selected from the group consisting of an oil-soluble dye, a disperse dye, and a vat dye.

The water-insoluble chain polymer is a colored resin particle dispersion having a structure represented by Formula (G), a cyclic structure, and a hydrophilic group.

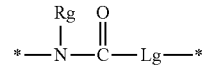

In Formula (G), Rg represents a hydrogen atom or a substituent, and Lg represents —O—, —S—, or —NRz-. Rz represents a hydrogen atom or a substituent. * represents a bonding position.

The detailed reason why the above-described effects are obtained by the colored resin particle dispersion according to the embodiment of the present invention is not clear, but presumed as follows.

As described above, the colored resin particle dispersion according to the embodiment of the present invention contains a specific dye and a specific water-insoluble chain polymer. The specific water-insoluble chain polymer is "chainlike". That is, it has no "crosslinking structure". In a case where a polymer having a crosslinking structure is used in the manufacturing of colored resin particles, particles having a so-called core-shell structure in which a core is composed of a dye and a shell is composed of the polymer are obtained. In a case where a chain polymer is used, it is thought that colored resin particles (also referred to as "dispersible particles") in which a dye and the chain polymer are uniformly dispersed are obtained. Since the specific water-insoluble chain polymer has a hydrophobic cyclic structure, the polymer has a high affinity for the specific dye also having hydrophobicity. Accordingly, it is thought that in a case where dispersible particles are used, the dye more easily adapts to the polymer than in a case where particles having a core-shell structure are used, and the dye can be stably contained even at a higher concentration, whereby high color developability can be realized.

In addition, since the specific water-insoluble chain polymer is hydrophobic, an image having excellent washing resistance, perspiration resistance, rub resistance, and dry cleaning resistance can be formed.

Furthermore, since the specific water-insoluble chain polymer has a hydrophilic group, the colored resin particles in the colored resin particle dispersion and the ink containing the colored resin particle dispersion have high dispersion stability. Furthermore, since the specific water-insoluble chain polymer contains a hydrophobic and rigid cyclic structure, it is thought that hydrolysis of the water-insoluble chain polymer is suppressed, and as a result, the dispersion stability of the colored resin particles is maintained, and an ink having excellent jetting stability and storage stability is obtained.

Furthermore, due to the above-described properties of the specific water-insoluble chain polymer, it is possible to form, on a plastic base material (hereinafter, also referred to as "base material"), an image having excellent color developability, pencil hardness (due to the rigid cyclic structure), and adhesiveness to the base material (due to the increased hydrophobicity due to the cyclic structure and the rise of the glass transition temperature).

<<Colored Resin Particles>>

The colored resin particles of the present invention will be described.

The average particle diameter of the colored resin particles of the present invention is preferably 200 nm or less, more preferably 20 to 200 nm, and even more preferably 40 to 150 nm. In a case where the average particle diameter of the colored resin particles is 200 nm or less, jetting by an inkjet method is facilitated.

In this specification, a value of a volume average particle diameter (MV) measured using a particle size distribution measurement apparatus (NANOTRAC UPA EX150, manufactured by Nikkiso Co., Ltd., trade name) was used as the average particle diameter of the colored resin particles.

In the colored resin particle dispersion and the ink according to the present invention, the colored resin particles exist in a dispersed manner.

The colored resin particles have a function of being readily compatible with water (wettable) when being dispersed as a property of the colored resin particles themselves or by using a dispersant together, a function of preventing the re-aggregation therebetween by electrostatic repulsion (repulsive force) or steric repulsion, and a function of suppressing the occurrence of precipitation.

A known method can be used as a method of dispersing the colored resin particles.

<Water-Insoluble Chain Polymer>

The water-insoluble chain polymer of the present invention has a structure represented by Formula (G), a cyclic structure, and a hydrophilic group.

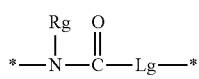

(G)

In Formula (G), Rg represents a hydrogen atom or a substituent, and Lg represents —O—, —S—, or —NRz-. Rz represents a hydrogen atom or a substituent. * represents a bonding position.

In the present invention, the term "water-insoluble" means that the amount of a dried sample for measurement, obtained by drying a substance (chain polymer) as a measurement target at 105° C. for 2 hours, dissolved in 100 g of distilled water at 25° C. is 1 g or less.

In the present invention, the term "chain polymer" means a polymer containing a main chain in which structural units which form the polymer are bonded in a chain.

The chain polymer may have a side chain branched from the main chain. That is, the chain polymer may have a branched structure.

(Structure Represented by Formula (G))

In Formula (G), Rg represents a hydrogen atom or a substituent, and the substituent is preferably a hydrocarbon group having 1 to 10 carbon atoms, more preferably a hydrocarbon group having 1 to 6 carbon atoms, and even more preferably a hydrocarbon group having 1 to 3 carbon atoms. The hydrocarbon group is preferably an alkyl group, an aryl group, or the like. Rg preferably represents a hydrogen atom.

In Formula (G), Lg represents —O—, —S—, or —NRz-. Rz represents a hydrogen atom or a substituent. A preferable range of Rz is the same as that of Rg described above.

Lg preferably represents —O— or —NRz-, and more preferably represents —O—.

The water-insoluble chain polymer of the present invention preferably has a structure represented by Formula (G) in the main chain. The structure represented by Formula (G) preferably represents a urethane bond, a thiourethane bond (—NH—C(=O)—S—), or a urea bond. The water-insoluble chain polymer of the present invention is preferably polyurethane, polythiourethane, or polyurea.

Polyurethane can be typically synthesized by reacting a diisocyanate compound with a diol compound. The polyurethane may further have a thiourethane bond and/or a urea bond.

Polythiourethane can be typically synthesized by reacting a diisocyanate compound with a dithiol compound. The polythiourethane may further have a urethane bond and/or a urea bond.

Polyurea can be typically synthesized by reacting a diisocyanate compound with a diamine compound. The polyurea may further have a urethane bond and/or a thiourethane bond.

The water-insoluble chain polymer may be synthesized by a known method (for example, the method described in WO2018/042916A), or a commercially available product may be used.

(Cyclic Structure)

The cyclic structure means a mono- or higher valent (preferably monovalent or divalent) group obtained by removing one or more (preferably one or two) optional hydrogen atoms from a cyclic compound.

The cyclic structure is preferably contained in the main chain of the water-insoluble chain polymer.

The ring (hereinafter, also referred to as "ring X") contained in the cyclic structure may be an aliphatic ring or an aromatic ring. The ring X may be a hydrocarbon ring or a heterocyclic ring.

The ring X is preferably a ring having 3 to 30 ring member carbon atoms, and more preferably a ring having 3 to 20 ring member carbon atoms.

The hydrocarbon ring may be an aliphatic ring or an aromatic ring. A hydrocarbon ring having 5 to 15 ring member carbon atoms is preferable, and a hydrocarbon ring having 6 to 12 ring member carbon atoms is more preferable.

Specific examples of the hydrocarbon ring include a cyclohexane ring, a norbornane ring (bicyclo[2.2.1]heptane ring), an octahydro-4,7-methano-1H-indene ring (tricyclo [5.2.1.02,6]decane ring), a benzene ring, a naphthalene ring, and a fluorene ring.

The heterocyclic ring is preferably a ring containing at least one of a nitrogen atom, an oxygen atom, or a sulfur atom, and having 3 to 12 ring member carbon atoms.

The ring X may have a substituent. In a case where the ring X has a substituent and is represented by a substituent Z, the substituent Z is not particularly limited, and examples thereof include an alkyl group, an alkoxy group, a halogen atom, a halogenated alkyl group, and a hetero atom-containing group.

The halogen atom as the substituent Z is preferably a fluorine atom, a chlorine atom, a bromine atom, or an iodine atom, and more preferably a fluorine atom, a chlorine atom, or a bromine atom.

The halogenated alkyl group as the substituent Z is preferably an alkyl group having at least one halogen atom and having 1 to 6 carbon atoms. A preferable range of the halogen atom in the halogenated alkyl group is the same as that of the halogen atom as the substituent Z.

The alkyl group as the substituent Z is preferably an alkyl group having 1 to 6 carbon atoms.

Examples of the hetero atom-containing group as the substituent Z include an alkoxy group, an acyloxy group, and a (meth)acryloyloxy group. The hetero atom-containing group is preferably an alkoxy group having 1 to 6 carbon atoms, more preferably a methoxy group or an ethoxy group, and particularly preferably a methoxy group.

The water-insoluble chain polymer preferably has at least one structural unit (repeating unit) selected from a structural unit represented by Formula (1) (also referred to as a structural unit (1)) and a structural unit represented by Formula (2) (also referred to as a structural unit (2)).

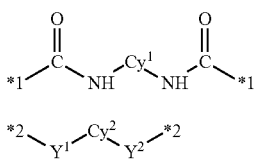
(1)

*2—Y¹—Cy²—Y²—*2    (2)

In Formulae (1) and (2),

Cy¹ and Cy² each independently represent a divalent organic group containing a cyclic structure, Y¹ and Y² each independently represent —O—, —S—, or —NRz-, and Rz represents a hydrogen atom or a substituent.

*1 and *2 each independently represent a bonding position.

The structural unit (1) is preferably equivalent to a structural unit derived from a diisocyanate compound, and the structural unit (2) is preferably equivalent to a structural unit derived from a diol compound, a dithiol compound, or a diamine compound.

*1 preferably represents a bonding position with a structural unit other than the structural unit (1). Examples of the structural unit other than the structural unit (1) include the structural unit (2) and a structural unit (3) to be described later.

*2 preferably represents a bonding position with a structural unit other than the structural unit (2). Examples of the structural unit other than the structural unit (2) include the structural unit (1).

Y¹ and Y² each independently represent an oxygen atom, a sulfur atom, or —NRz-, and Rz represents a hydrogen atom or a substituent.

Rz is the same as Rz in Formula (G) described above.

Y¹ and Y² each independently represent preferably —O— or —NRz-, and more preferably represent —O—.

Cy¹ and Cy² each independently represent a divalent organic group containing a cyclic structure.

Cy¹ and Cy² each independently represent preferably a group represented by Formula (RA1) or (RA2).

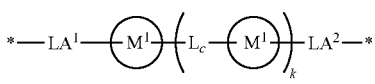
(RA1)

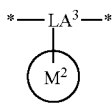
(RA2)

In Formula (RA1), M¹'s each independently represent a ring optionally having a substituent, Lc represents a divalent linking group, k represents an integer of 0 or more, and LA¹ and LA² each independently represent a single bond or a divalent linking group. In a case where a plurality of M¹'s are present, they may be the same or different. In a case where a plurality of Lc's are present, they may be the same or different. * represents a bonding position.

In Formula (RA2), M² represents a ring optionally having a substituent, and LA³ represents a trivalent linking group. * represents a bonding position.

M¹ in Formula (RA1) and M² in Formula (RA2) are the same as the above-described ring X.

The optional substituent of M¹ in Formula (RA1) and M² in Formula (RA2) is the same as the above-described substituent Z.

In Formula (RA1), Lc represents a divalent linking group. Examples of Lc include an alkylene group, an alkyleneoxy group, a sulfonyl group, a carbonyl group, an ether group (—O—), an ester group (—COO—), a spiro ring group, and a group obtained by combining the above groups. An alkylene group or a sulfonyl group having 1 to 10 carbon atoms is preferable.

Lc may have a substituent, and examples of the substituent include the above-described substituent Z.

In Formula (RA1), k represents an integer of 0 or more, preferably represents an integer of 0 to 2, and more preferably represents 0 or 1.

In Formula (RA1), LA¹ and LA² each independently represent a single bond or a divalent linking group.

Examples of the divalent linking group as LA¹ and LA² include those mentioned above as the examples of Lc.

LA¹ and LA² particularly preferably represent a single bond or an alkylene group having 1 to 10 carbon atoms.

LA¹ and LA² may have a substituent, and examples of the substituent include the above-described substituent Z.

In Formula (RA2), LA³ represents a trivalent linking group.

Examples of LA³ include a trivalent hydrocarbon group having 1 to 10 carbon atoms, and a trivalent linking group obtained by combining a hydrocarbon group having 1 to 10 carbon atoms with at least one divalent linking group selected from a sulfonyl group, a carbonyl group, an ether group (—O—), an ester group (—COO—), and a spiro ring group.

LA³ may have a substituent, and examples of the substituent include the above-described substituent Z.

From the viewpoint of making the water-insoluble chain polymer more hydrophobic and rigid, and further improving the performances, at least one of Cy¹ or Cy² preferably has two or more rings, and more preferably has three or more rings.

In this specification, the number of rings means the number of monocyclic rings.

Accordingly, the concept of "containing two or more rings" includes not only containing two or more monocyclic rings which are not a part of a fused ring, a bridged ring, or a spiro ring, but also containing one fused ring, containing one bridged ring, and containing one spiro ring.

At least one of Cy¹ or Cy² preferably contains a 5- or 6-membered ring.

Here, the concept of "containing a 5- or 6-membered ring" includes containing a fused ring containing a 5- or 6-membered monocyclic ring, containing a bridged ring containing a 5- or 6-membered monocyclic ring, and containing a spiro ring containing a 5- or 6-membered monocyclic ring.

Specific examples of Cy¹ include the structure described in paragraph [0060] of WO2018/042916A.

Specific examples of Cy² include the structure described in paragraph [0064] of WO2018/042916A.

From the viewpoint of making the water-insoluble chain polymer more hydrophobic and rigid, and further improving the performances, the water-insoluble chain polymer preferably has both the structural unit (1) and the structural unit (2).

Examples of the compound for forming the structural unit (1) (hereinafter, also referred to as "compound for forming a unit (1)" or "compound for a unit (1)" include a diisocyanate compound.

The compound for forming a unit (1) may have, in addition to an isocyanate group, a polymerizable group other than the isocyanate group.

Specific examples of the compound for forming a unit (1) include the compound for forming a unit (1) described in paragraph [0067] of WO2018/042916A.

Examples of the compound for forming the structural unit (2) (hereinafter, also referred to as "compound for forming a unit (2)" or "compound for a unit (2)") include a diol compound, a dithiol compound, and a diamine compound.

The compound for forming a unit (2) may have, in addition to a hydroxyl group or an amino group, a polymerizable group other than the above groups.

Specific examples of the compound for forming a unit (2) include the compound for forming a unit (2) described in paragraphs [0069] and [0070] of WO2018/042916A.

The total amount of at least one structural unit selected from the structural unit (1) and the structural unit (2) with respect to the total amount of the water-insoluble chain polymer is preferably 15 mass % or greater, more preferably 30 mass % or greater, even more preferably 45 mass % or greater, yet even more preferably 60 mass % or greater, and particularly preferably 70 mass % or greater. Accordingly, a proportion of the cyclic structure in the water-insoluble chain polymer is increased, and as a result, the effects of the present invention described above are further improved. The expression "the total amount of at least one structural unit selected from the structural unit (1) and the structural unit (2)" represents a total amount of the structural unit (1) and the structural unit (2).

Although not particularly limited, the upper limit of the total amount of the structural unit (1) and the structural unit (2) with respect to the total amount of the water-insoluble chain polymer is, for example, 98 mass % or less, and preferably 95 mass % or less.

In a case where the total amount of the cyclic structure in 1 g of the water-insoluble chain polymer is defined as a ring value of the water-insoluble chain polymer, the ring value of the water-insoluble chain polymer is preferably 0.7 mmol/g or greater. Accordingly, the effects of the present invention are further improved.

The ring value of the water-insoluble chain polymer is more preferably 4.00 mmol/g or greater.

Although not particularly limited, the upper limit of the ring value of the water-insoluble chain polymer is, for example, 9.00 mmol/g or less.

In a case where the cyclic structures contained in the water-insoluble chain polymer are the structural unit (1) and the structural unit (2) only, the ring value of the water-insoluble chain polymer can also be obtained by the following expression.

> Ring Value of Water-Insoluble Chain Polymer(mmol/g)=(((Content(mass %) of Structural Unit(1) with respect to Total Amount of Water-Insoluble Chain Polymer)/100)×Number of Cyclic Structures in Structural Unit(1)/Molecular Weight of Structural Unit(1))+((Content(mass %) of structural Unit(2) with respect to Total Amount of Water-Insoluble Chain Polymer)/100)×Number of Cyclic Structures in Structural Unit(2)/Molecular Weight of Structural Unit(2))×1,000

(Hydrophilic Group)

The water-insoluble chain polymer contains a hydrophilic group.

The hydrophilic group contained in the water-insoluble chain polymer contributes to the dispersion stability of the colored resin particle dispersion and the ink.

As the hydrophilic group, an anionic group or a nonionic group is preferable, and an anionic group is more preferable from the viewpoint of an excellent dispersion stability improvement effect.

For example, in a case where an anionic group and a nonionic group having the same molecular weight are compared each other, the anionic group has a more excellent dispersion stability improvement effect. That is, an anionic group (particularly preferably at least one selected from the group consisting of a carboxyl group and a salt of a carboxyl group) can sufficiently exhibit the dispersion stability improvement effect even in a case where the anionic group has a low molecular weight.

The anionic group may be an unneutralized anionic group or a neutralized anionic group.

Examples of the unneutralized anionic group include a carboxyl group, a sulfo group, a sulfate group, a phosphonate group, and a phosphate group.

Examples of the neutralized anionic group include a salt of a carboxyl group, a salt of a sulfo group, a salt of a sulfonate group, a salt of a phosphonate group, and a salt of a phosphate group.

In this specification, the expression "a carboxyl group is neutralized" means that a carboxyl group as an anionic group is in the form of "salt" (for example, "—COONa"). The same applies to a sulfo group, a sulfate group, a phosphonate group, and a phosphate group as an anionic group.

Neutralization can be performed using, for example, an alkali metal hydroxide (for example, sodium hydroxide, potassium hydroxide, and the like) and an organic amine (for example, triethylamine, and the like).

As the anionic group which may be contained in the water-insoluble chain polymer, from the viewpoint of dispersion stability, at least one selected from the group consisting of a carboxyl group, a salt of a carboxyl group, a sulfo group, a salt of a sulfo group, a sulfate group, a salt of a sulfate group, a phosphonate group, a salt of a phosphonate group, a phosphate group, and a salt of a phosphate group is preferable, and at least one selected from the group consisting of a carboxyl group and a salt of a carboxyl group is more preferable.

As the "salt" in the salt of a carboxyl group, the salt of a sulfo group, the salt of a sulfate group, the salt of a phosphonate group, and the salt of a phosphate group, an alkali metal salt or an organic amine salt is preferable, or an alkali metal salt is more preferable.

The alkali metal in the alkali metal salt is preferably K or Na.

In a case where the water-insoluble chain polymer contains an anionic group as a hydrophilic group and the total amount of the anionic group in 1 g of the water-insoluble chain polymer is defined as an acid value of the water-insoluble chain polymer, the acid value of the water-insoluble chain polymer is preferably 0.10 mmol/g to 2.00 mmol/g, and more preferably 0.30 mmol/g to 1.50 mmol/g from the viewpoint of dispersion stability.

In the present invention, in particular, the total amount of the carboxyl group and the salt of the carboxyl group in 1 g of the water-insoluble chain polymer is preferably 0.30 mmol/g to 1.50 mmol/g.

In a case where the water-insoluble chain polymer has an anionic group as a hydrophilic group, the degree of neutralization of the anionic group of the water-insoluble chain polymer is preferably 50% to 100%, and more preferably 70% to 90%.

Here, the degree of neutralization refers to a ratio of "the number of neutralized anionic groups" to "the sum of the number of unneutralized anionic groups (for example, carboxyl group) and the number of neutralized anionic groups (for example, salt of carboxyl group) in the water-insoluble chain polymer contained in the ink (that is, a ratio [number of neutralized anionic groups/(number of unneutralized anionic groups+number of neutralized anionic groups)]).

The degree of neutralization (%) of the water-insoluble chain polymer is measured by neutralization titration.

In this specification, the degree of neutralization (%) of the water-insoluble chain polymer is obtained as follows.

First, an aqueous dispersion (for example, ink) of colored resin particles containing a water-insoluble chain polymer as a measurement target is prepared.

50 g of the aqueous dispersion prepared is subjected to centrifugal separation under conditions of 80,000 rpm (rounds per minute; the same hereinafter) and 40 minutes. The supernatant liquid generated by centrifugal separation is removed, and the precipitate (colored resin particles) is collected.

Approximately 0.5 g of the colored resin particles collected is weighed in a container 1, and a weighed value W1 (g) is recorded. Next, a mixed liquid of 54 mL of tetrahydrofuran (THF) and 6 mL of distilled water is added, and the weighed specific particles are diluted to obtain a sample 1 for measuring a degree of neutralization.

The obtained sample 1 for measuring a degree of neutralization is titrated using a 0.1 N (=0.1 mol/L) sodium hydroxide aqueous solution as a titration liquid, and the amount of the titration liquid required until the equivalence point is reached is recorded as F1 (mL). In a case where a plurality of equivalence points are obtained in the titration, the value of the equivalence point at the maximum titer is used. Here, the "maximum titer F1 (mL)" is equivalent to the amount of unneutralized anionic groups (for example, —COOH) among anionic groups contained in the colored resin particles.

In addition, approximately 0.5 g of the colored resin particles collected is weighed in a container 2, and a weighed value W2 (g) is recorded. Next, 60 mL of an acetic acid is added, and the weighed colored resin particles are diluted to obtain a sample 2 for measuring a degree of neutralization.

The obtained sample 2 for measuring a degree of neutralization is titrated using a 0.1 N (=0.1 mol/L) perchloric acid-acetic acid solution as a titration liquid, and the amount of the titration liquid required until the equivalence point is reached is recorded as F2 (mL). In a case where a plurality of equivalence points are obtained in the titration, the value of the equivalence point at the maximum titer is used. Here, the "maximum titer F2 (mL)" is equivalent to the amount of neutralized anionic groups (for example, —COONa) among anionic groups contained in the colored resin particles.

Based on the measured "F1 (mL)" and "F2 (mL)", the degree of neutralization (%) of the anionic group is obtained according to the following expression F1 (mL)×Normality of Sodium Hydroxide Aqueous solution (0.1 mol/L)/W1 (g)+F2 (mL)×Normality of Perchloric Acid-Acetic Acid Solution (0.1 mol/L)/W2 (g)=Total Amount of Anionic Groups Contained in Colored Resin Particles (total amount of neutralized anionic groups and unneutralized anionic groups)(mmol/g)  (1)

F2 (mL)×Normality of Perchloric Acid-Acetic Acid Solution (0.1 mol/L)/W2(g)=Amount of Neutralized Anionic Groups Among Anionic Groups Contained in Colored Resin Particles (mmol/g)  (2)

Degree of Neutralization (%)=(2)/(1)×100

The nonionic group as a hydrophilic group is preferably a group having a polyether structure, and is more preferably a group containing a polyalkyleneoxy group.

—Structural Unit Having hydrophilic Group—

The water-insoluble chain polymer preferably contains a structural unit having a hydrophilic group.

The structural unit having a hydrophilic group is preferably formed using a compound for introducing a hydrophilic group to be described later as a raw material.

The structural unit having a hydrophilic group is particularly preferably a structural unit represented by Formula (3) (also referred to as a structural unit (3)), which is a structural unit having an anionic group.

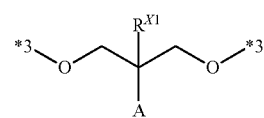

(3)

In the structural unit (3), $R^{X1}$ represents a hydrogen atom or an alkyl group having 1 to 10 carbon atoms, A represents an anionic group, and *3 represents a bonding position with a structural unit other than the structural unit (3).

Here, the expression "*3 represents a bonding position with a structural unit other than the structural unit (3)" means that structural units (3) are not directly bonded to each other in the water-insoluble chain polymer.

As the structural unit other than the structural unit (3) bonded to the position *3 in the structural unit (3), only one type or two or more types of structural units may be used.

The structural unit other than the structural unit (3) is not particularly limited. Examples thereof include a structural unit derived from a diisocyanate compound (for example, the structural unit (1)), and a urethane bond is preferably formed by bonding with the structural unit (3).

Examples of the anionic group represented by A are the same as those exemplified for the anionic group described above.

The anionic group represented by A is preferably a carboxyl group or a salt of a carboxyl group.

The water-insoluble chain polymer may contain a structural unit (3) in which A is a carboxyl group and a structural unit (3) in which A is a salt of a carboxyl group.

The content of the structural unit (for example, structural unit (3)) having a hydrophilic group with respect to the total amount of the water-insoluble chain polymer is preferably 3 mass % to 30 mass %, and is more preferably 5 mass % to 20 mass %.

The content of the structural unit having an anionic group with respect to the total amount of the water-insoluble chain polymer may be adjusted in consideration of the acid value of the water-insoluble chain polymer.

—Compound for Introducing Hydrophilic Group—

A hydrophilic group can be introduced into the water-insoluble chain polymer using a compound for introducing a hydrophilic group.

Among compounds for introducing a hydrophilic group, examples of the compound for introducing an anionic group include amino acids such as α-amino acids (specifically, lycine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of the compound for introducing an anionic group include, in addition to the above-described α-amino acids, compounds having at least one or more (preferably 1 or 2) selected from a hydroxyl group, a thiol group, and a —NHR$^{N1}$ group (R$^{N1}$ represents a hydrogen atom or a hydrocarbon group having 1 to 10 carbon atoms), and having a carboxyl group, a sulfo group, a sulfate group, a phosphonate group, or a phosphate group as an anionic group. The compound for introducing an anionic group may have a betaine structure (intramolecular salt structure). Specific examples thereof include the compound described in paragraph [0114] of WO2018/042916A.

As the compound for introducing an anionic group, an inorganic base such as sodium hydroxide or potassium hydroxide; an organic base such as triethylamine; or the like may be used to neutralize at least a part of the anionic group.

Among compounds for introducing a hydrophilic group, a compound having a polyether structure is preferable, and a compound having a polyoxyalkylene group is more preferable as a compound for introducing a nonionic group.

(Polymerizable Group)

The water-insoluble chain polymer preferably also contains a polymerizable group.

The polymerizable group contributes to image curing by light, heat, infrared rays, or the like. That is, due to the polymerizable group contained in the water-insoluble chain polymer, in a case where an image formed by an ink containing the colored resin particle dispersion is cured, the colored resin particles are bonded by the polymerizable group, and as a result, the image is thought to have improved hydrophobicity and rigidity. In addition, due to the polymerizable group contained in the water-insoluble chain polymer, a cured film to be obtained has a high glass transition temperature (gelation), cohesive failure of the film is suppressed, and adhesiveness and film quality are further improved.

In a case where the water-insoluble chain polymer contains a polymerizable group, the polymerizable group may be contained in at least one of the structural unit (1) or the structural unit (2), or in a part other than the structural unit (1) and the structural unit (2) in the water-insoluble chain polymer. Examples of the part other than the structural unit (1) and the structural unit (2) include a structural unit derived from a diisocyanate compound other than the structural unit (1), a structural unit derived from a diol compound, a dithiol compound, or a diamine compound other than the structural unit (2), and the structural unit (3).

A photopolymerizable group or a thermally polymerizable group is preferable as the polymerizable group.

The photopolymerizable group is preferably a radically polymerizable group, more preferably a group containing an ethylenic double bond, and even more preferably a group containing at least one of a vinyl group or a 1-methylvinyl group. The radically polymerizable group is particularly preferably a (meth)acryloyl group from the viewpoint of radical polymerization reactivity and hardness of a film to be formed.

The thermally polymerizable group is preferably an epoxy group, an oxetanyl group, an aziridinyl group, an azetidinyl group, a ketone group, an aldehyde group, or a blocked isocyanate group.

The water-insoluble chain polymer may contain only one type or two or more types of polymerizable groups.

The fact that the water-insoluble chain polymer has a polymerizable group can be confirmed by, for example, Fourier transform infrared spectroscopy (FT-IR) analysis.

Examples of the method of introducing a polymerizable group into the water-insoluble chain polymer include using a compound for introducing a polymerizable group in the synthesis of the water-insoluble chain polymer. Regarding the compound for introducing a polymerizable group, the description in paragraphs [0117] to [0124] of WO2018/042916A can be referred to.

In a case where the water-insoluble chain polymer has a polymerizable group, thermosetting is easily performed by adding a radical polymerization initiator, and thus a cured film having particularly high hardness can be obtained. An initiator such as a peroxide or an azo compound can be used as the radical polymerization initiator. From the viewpoint of storage stability, a 10 hour half-life temperature of the radical polymerization initiator is desirably 100° C. or higher. The radical polymerization initiator is not particularly limited, and examples thereof include PERBUTYL A, PERHEXA 22, PERBUTYL Z, PERHEXA V, PERBUTYL P, PERCUMYL D, PERHEXYL D, PERHEXA 25B, PERBUTYL C, PERBUTYL D, PERMENTA H, PERHEXYNE 25B, PERCUMYL P, PEROCTA H, PERCUMYL H, PERBUTYL H, AND NOFMER BC manufactured by NOF CORPORATION.

The amount of the radical polymerization initiator used is preferably 0.1 to 20 mass %, and more preferably 0.1 to 10 mass % with respect to the total amount of the water-insoluble chain polymer.

The radical polymerization initiator may be contained in the colored resin particles together with the specific dye and the water-insoluble chain polymer, or contained in the colored resin particle dispersion separately from the colored resin particles.

(Other Diisocyanate Compounds, Diol Compounds, Dithiol Compounds, and Diamine Compounds)

In the synthesis of the water-insoluble chain polymer, a diisocyanate compound (aliphatic diisocyanate compound) other than the compound for forming a unit (1), a diol compound (aliphatic diol compound) other than the compound for forming a unit (2), a dithiol compound (aliphatic dithiol compound), or a diamine compound (aliphatic diamine compound) can also be used.

The diisocyanate compound, the diol compound, the dithiol compound, and the diamine compound described above may contain a hetero atom in the molecule. For example, at least one selected from —O—, —CO—, —COO—, —OCOO—, —S—, and —SO$_2$— may be contained. The above compounds may have a substituent, and examples of the substituent include the above-described substituent Z.

The weight-average molecular weight of the water-insoluble chain polymer is preferably 5,000 to 100,000, more preferably 8,000 to 70,000, and even more preferably 10,000 to 50,000 from the viewpoint of dispersion stability of the ink (that is, dispersion stability of the colored resin particles).

In this specification, the weight-average molecular weight (Mw) means a value measured by gel permeation chromatography (GPC).

In the measurement of Mw by gel permeation chromatography (GPC), HLC (registered trademark)-8020GPC (Tosoh Corporation) is used as a measurement device, three columns of TSKgel (registered trademark) Super Multipore HZ—H (4.6 mm ID×15 cm, Tosoh Corporation) are used, and tetrahydrofuran (THF) is used as an eluent. Regarding measurement conditions, the sample concentration is 0.45 mass %, the flow rate is 0.35 ml/min, the sample injection amount is 10 μl, the measurement temperature is 40° C., and a RI detector is used.

A calibration curve is created from 8 samples of "standard sample TSK standard, polystyrene" of Tosoh Corporation: "F-40", "F-20", "F-4", "F-1", "A-5000", "A-2500", "A-1000", and "n-propylbenzene".

The content of the water-insoluble chain polymer is preferably 10 mass % or greater, and more preferably 20 mass % or greater with respect to the solid content of the colored resin particles.

In a case where the content of the water-insoluble chain polymer is 10 mass % or greater with respect to the solid content of the colored resin particles, the dispersion stability of the ink (that is, the dispersion stability of the colored resin particles) is further improved.

The content of the water-insoluble chain polymer is preferably 80 mass % or less, more preferably 70 mass % s or less, even more preferably 60 mass % or less, particularly preferably 50 mass % or less, and most preferably 40 mass % or less with respect to the solid content of the colored resin particles.

The mass ratio of the content of the water-insoluble chain polymer to the content of at least one dye selected from the group consisting of an oil-soluble dye, a disperse dye, and a vat dye to be described later is preferably 0.1 to 2.5, more preferably 0.1 to 1, and even more preferably 0.1 to 0.7.

The colored resin particles may contain a polymer other than the water-insoluble chain polymer as long as the effects of the ink of the present disclosure are not impaired.

Examples of other polymers include chain polymers other than the water-insoluble chain polymer, and polymers having a three-dimensional crosslinking structure.

From the viewpoint of more effectively exhibiting the effects of the ink of the present disclosure, the proportion of the water-insoluble chain polymer in all the polymer components in the colored resin particles is preferably 80 mass % to 100 mass %, more preferably 90 mass % to 100 mass %, even more preferably 95 mass % to 100 mass %, and ideally 100 mass %.

<At Least One Dye Selected from Group Consisting of Oil-Soluble Dye, Disperse Dye, and Vat Dye>

The colored resin particles contain at least one (also referred to as "specific dye") selected from the group consisting of an oil-soluble dye, a disperse dye, and a vat dye.

The following dyes are preferable as the specific dye. "C. I." is an abbreviation for "color index". Those described with "Disperse" are disperse dyes, and those described as "Solvent" are oil-soluble dyes.

C. I. Disperse Yellow 3, 7, 8, 23, 39, 51, 54, 60, 71, and 86,

C. I. Solvent Yellow 2, 14, 16, 21, 33, 43, 44, 56, 82, 85, 93, 98, 114, 131, 135, 157, 160, 163, 167, 176, 179, 185, and 189, C. I. Disperse Red 11, 50, 53, 55, 55:1, 59, 60, 65, 70, 75, 93, 146, 158, 190, 190:1, 207, 239, and 240, C. I. Solvent Red 8, 23, 24, 25, 49, 52, 109, 111, 119, 122, 124, 135, 146, 149, 150, 168, 169, 172, 179, 195, 196, 197, 207, 222, 227, 312, and 313, C. I. Disperse Blue 3, 5, 19, 26, 26:1, 35, 55, 56, 58, 64, 64:1, 72, 72:1, 81, 81:1, 91, 95, 108, 131, 141, 145, 359, and 360, C. I. Solvent Blue 3, 4, 5, 35, 36, 38, 44, 45, 59, 63, 67, 68, 70, 78, 83, 97, 101, 102, 104, 105, 111, and 122, C. I. Disperse Orange 1, 1:1, 5, 7, 20, 23, 25, 25:1, 33, 56, and 76, C. I. Solvent Orange 3, 14, 54, 60, 62, 63, 67, 86, and 107, C. I. Disperse Violet 8, 11, 17, 23, 26, 27, 28, 29, 36, and 57, C. I. Solvent Violet 8, 9, 11, 13, 14, 26, 28, 31, 36, and 59, C. I. Solvent Green 3, 5, 7, and 28, C. I. Disperse Brown 2, C. I. Solvent Brown 53, and C. I. Solvent Black 3, 5, 7, 27, 28, 29, and 34

The following dyes are particularly preferable as the vat dye.

C. I. Vat Yellow 2, 4, 10, 20, and 33; C. I. Vat Orange 1, 2, 3, 5, 7, 9, 13, and 15; C. I. Vat Red 1, 2, 10, 13, 15, 16, 41, and 61; C. I. Vat Blue 1, 3, 4, 5, 6, 8, 12, 14, 18, 19, 20, 29, 35, and 41; and C. I. Vat Black 1, 8, 9, 13, 14, 20, 25, 27, 29, 36, 56, 57, 59, and 60

Among the dyes, oil-soluble dyes are preferable.

The oil-soluble dye is more preferably a dye having two azo groups.

The oil-soluble dye preferably contains a metal complex or a compound represented by Formula (M-A).

The oil-soluble dye containing a metal complex is preferably an oil-soluble dye containing a chromium complex.

Specific examples of the oil-soluble dye containing a chromium complex are not particularly limited, and include C. I. Solvent Black 27, C. I. Solvent Black 28, and C. I. Solvent Black 29.

Examples of the oil-soluble dye containing a metal complex other than the above include C. I. Solvent Blue 70 (an oil-soluble dye containing a copper complex).

The compound represented by Formula (M-A) will be described.

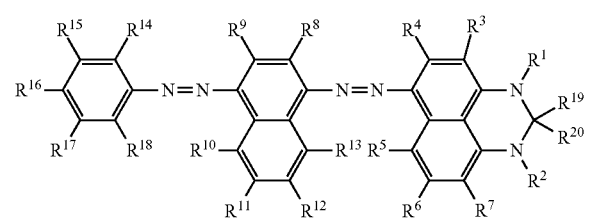

(M-A)

In Formula (M-A), $R^1$ to $R^{20}$ each independently represent a hydrogen atom or a substituent.

Examples of the substituent include substituents (preferably substituents selected from the substituent group A1) selected from the substituent group A.

In Formula (M-A), $R^1$ and $R^2$ preferably represent a hydrogen atom.

Preferable examples of $R^3$ to $R^{18}$ include a hydrogen atom.

$R^{19}$ and $R^{20}$ each independently represent preferably an alkyl group, more preferably an alkyl group having 1 to 30 carbon atoms, even more preferably an alkyl group having 1 to 10 carbon atoms, particularly preferably an alkyl group having 1 to 6 carbon atoms, and most preferably a methyl group.

Preferable examples of the compound represented by Formula (M-A) include a compound represented by Formula (M-A-1).

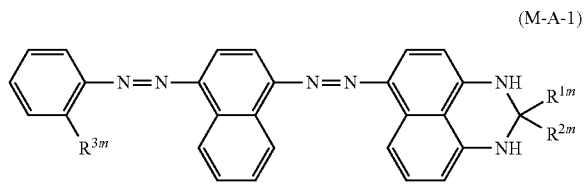

(M-A-1)

In Formula (M-A-1), $R^{1m}$ and $R^{2m}$ each independently represent an alkyl group optionally having a substituent and having 1 to 12 carbon atoms, $R^{3m}$ represents a halogen atom, a nitro group, a cyano group, an alkoxycarbonyl group having 2 to 12 carbon atoms, or an acyl group having 2 to 12 carbon atoms. $R^{1m}$ and $R^{2m}$ may be bonded to each other to form a ring.

In Formula (M-A-1), $R^{1m}$ and $R^{2m}$ each independently represent an alkyl group optionally having a substituent and having 1 to 12 carbon atoms.

The alkyl group represented by $R^{1m}$ and $R^{2m}$ may be linear or branched.

The number of carbon atoms of the alkyl group represented by $R^{1m}$ and $R^{2m}$ is 1 to 12, preferably 1 to 8, and more preferably 1 to 5.

The alkyl group represented by $R^{1m}$ and $R^{2m}$ may have a substituent. The substituent is not particularly limited, and examples thereof include a hydroxyl group, an alkylcarbonyloxy group (preferably an alkylcarbonyloxy group having 2 to 8 carbon atoms), an alkylaminocarbonyloxy group (preferably an alkylaminocarbonyloxy group having 2 to 8 carbon atoms), a cyano group, a carbamoyl group, an alkylcarbamoyl group (preferably an alkylcarbamoyl group having 2 to 8 carbon atoms), an arylcarbamoyl group (preferably an arylcarbamoyl group having 7 to 11 carbon atoms, and more preferably a phenylcarbamoyl group), and an aryl group (preferably an aryl group having 6 to 10 carbon atoms, and more preferably a phenyl group).

The alkyl group represented by $R^{1m}$ and $R^{2m}$ preferably has no substituent (that is, an unsubstituted alkyl group).

$R^{1m}$ and $R^{2m}$ may be bonded to each other to form a ring.

In a case where $R^{1m}$ and $R^{2m}$ are bonded to each other to form a ring, $R^{1m}$ and $R^{2m}$ form an alkylene group. The number of carbon atoms of the alkylene group is preferably 2 to 12, and more preferably 2 to 8. The alkylene group may have a substituent. The substituent is not particularly limited, and examples thereof include those described above as the optional substituent of the alkyl group.

$R^{1m}$ and $R^{2m}$ preferably represent an unsubstituted alkyl group having 1 to 12 carbon atoms, or an alkyl group having a hydroxyl group, an alkylcarbonyloxy group, or an alkylaminocarbonyloxy group as a substituent and having 1 to 12 carbon atoms from the viewpoint of stability to heat, and more preferably represent an unsubstituted alkyl group having 1 to 12 carbon atoms, even more preferably represent an unsubstituted alkyl group having 1 to 8 carbon atoms, and particularly preferably represent an unsubstituted alkyl group having 1 to 5 carbon atoms from the viewpoint of solubility and manufacturing cost.

From the viewpoint of solubility, it is particularly preferable that $R^{1m}$ and $R^{2m}$ are different.

$R^{3m}$ in Formula (M-A-1) represents a halogen atom, a nitro group, a cyano group, an alkoxycarbonyl group having 2 to 12 carbon atoms, or an acyl group having 2 to 12 carbon atoms.

In a case where $R^{3m}$ represents a halogen atom, examples thereof include a fluorine atom, a chlorine atom, a bromine atom, and an iodine atom. A fluorine atom or a chlorine atom is preferable, and a chlorine atom is more preferable.

In a case where $R^{3m}$ represents an alkoxycarbonyl group having 2 to 12 carbon atoms, an alkoxycarbonyl group having 2 to 8 carbon atoms is preferable, and an alkoxycarbonyl group having 2 to 5 carbon atoms is more preferable.

In a case where $R^{3m}$ represents an acyl group having 2 to 12 carbon atoms, an acyl group having 2 to 8 carbon atoms is preferable, and an acyl group having 2 to 5 carbon atoms is more preferable. Examples of the acyl group having 2 to 12 carbon atoms include an alkylcarbonyl group having 2 to 12 carbon atoms and an arylcarbonyl group having 6 to 12 carbon atoms (for example, benzoyl group), and an alkylcarbonyl group having 2 to 12 carbon atoms is preferable.

From the viewpoint of heat resistance, $R^{3m}$ is preferably a fluorine atom, a chlorine atom, a nitro group, a cyano group, an alkoxycarbonyl group having 2 to 12 carbon atoms, or an acyl group having 2 to 12 carbon atoms, more preferably a fluorine atom, a chlorine atom, a nitro group, a cyano group, or an alkylcarbonyl group having 2 to 12 carbon atoms, even more preferably a chlorine atom, a cyano group, a nitro group, or an alkylcarbonyl group having 2 to 5 carbon atoms, and most preferably a chlorine atom, a nitro group, a cyano group, or an acetyl group.

Specific examples of the compound represented by Formula (M-A-1) will be shown below, but the present invention is not limited thereto. In the following compounds (1-25) to (1-30) and (1-52), $R^{1m}$ and $R^{2m}$ in Formula (M-A-1) are bonded to each other to form a ring. Ph represents a phenyl group.

TABLE 1

| Compound | $R^{1m}$ | $R^{2m}$ | $R^{3m}$ |
|---|---|---|---|
| (1-1) | —CH$_3$ | —CH$_3$ | —Cl |
| (1-2) | —C$_2$H$_5$ | —CH$_3$ | —Cl |
| (1-3) | —(CH$_2$)$_2$CH$_3$ | —CH$_3$ | —Cl |
| (1-4) | —CH(CH$_3$)$_2$ | —CH$_3$ | —Cl |
| (1-5) | —(CH$_2$)$_3$CH$_3$ | —CH$_3$ | —Cl |
| (1-6) | —CH$_2$CH(CH$_3$)$_2$ | —CH$_3$ | —Cl |
| (1-7) | —CH(CH$_3$)CH$_2$CH$_3$ | —CH$_3$ | —Cl |
| (1-8) | —C(CH$_3$)$_3$ | —CH$_3$ | —Cl |
| (1-9) | —(CH$_2$)$_4$CH$_3$ | —CH$_3$ | —Cl |
| (1-10) | —(CH$_2$)$_2$CH(CH$_3$)$_2$ | —CH$_3$ | —Cl |
| (1-11) | —(CH$_2$)$_5$CH$_3$ | —CH$_3$ | —Cl |
| (1-12) | —(CH$_2$)$_7$CH$_3$ | —CH$_3$ | —Cl |
| (1-13) | —(CH$_2$)$_9$CH$_3$ | —CH$_3$ | —Cl |
| (1-14) | —(CH$_2$)$_{11}$CH$_3$ | —CH$_3$ | —Cl |
| (1-15) | —C$_2$H$_5$ | —C$_2$H$_5$ | —Cl |

TABLE 2

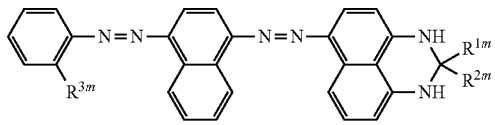

| Compound | $R^{1m}$ | $R^{2m}$ | $R^{3m}$ |
|---|---|---|---|
| (1-16) | —CH$_2$CH(CH$_3$)$_2$ | —CH$_2$CH(CH$_3$)$_2$ | —Cl |
| (1-17) | —CH$_2$OH | —CH$_3$ | —Cl |
| (1-18) | —CH$_2$OCOCH$_3$ | —CH$_3$ | —Cl |
| (1-19) | —CH$_2$OCOCH(CH$_3$)$_2$ | —CH$_3$ | —Cl |
| (1-20) | —CH$_2$OCOCH(C$_2$H$_5$)CH$_2$CH$_2$CH$_2$CH$_3$ | —CH$_3$ | —Cl |
| (1-21) | —CH$_2$OCONHCH(CH$_3$)$_2$ | —CH$_3$ | —Cl |
| (1-22) | —CH$_2$OH | —CH$_2$OH | —Cl |
| (1-23) | —CH$_2$OCOCH$_3$ | —CH$_2$OCOCH$_3$ | —Cl |
| (1-24) | —CH$_2$OCOCH(CH$_3$)$_2$ | —CH$_2$OCOCH(CH$_3$)$_2$ | —Cl |
| (1-25) | —(CH$_2$)$_4$— | | —Cl |
| (1-26) | —(CH$_2$)$_5$— | | —Cl |
| (1-27) | —CH(CH$_3$)CH$_2$CH$_2$CH$_2$CH$_2$— | | —Cl |
| (1-28) | —CH$_2$CH(CH$_3$)CH$_2$CH$_2$CH$_2$— | | —Cl |
| (1-29) | —CH$_2$CH$_2$CH(OH)CH$_2$CH$_2$— | | —Cl |
| (1-30) | —CH$_2$CH$_2$CH(OCOCH$_3$)CH$_2$CH$_2$— | | —Cl |

TABLE 3

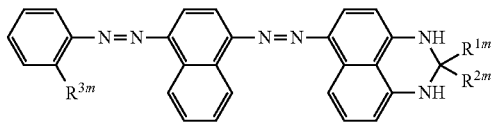

| Compound | $R^{1m}$ | $R^{2m}$ | $R^{3m}$ |
|---|---|---|---|
| (1-31) | —CH$_3$ | —CH$_3$ | —F |
| (1-32) | —C$_2$H$_5$ | —CH$_3$ | —F |
| (1-33) | —(CH$_2$)$_4$CH$_3$ | —CH$_3$ | —F |
| (1-34) | —CH$_3$ | —CH$_3$ | —Br |
| (1-35) | —C$_2$H$_5$ | —CH$_3$ | —Br |
| (1-36) | —CH$_3$ | —CH$_3$ | —NO$_2$ |
| (1-37) | —C$_2$H$_5$ | —CH$_3$ | —NO$_2$ |
| (1-38) | —CH$_3$ | —CH$_3$ | —CN |

TABLE 3-continued

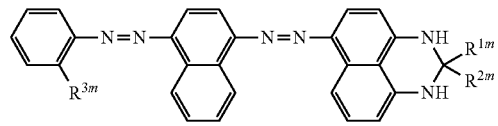

| Compound | $R^{1m}$ | $R^{2m}$ | $R^{3m}$ |
|---|---|---|---|
| (1-39) | —C$_2$H$_5$ | —CH$_3$ | —CN |
| (1-40) | —CH$_3$ | —CH$_3$ | —CO$_2$CH$_3$ |
| (1-41) | —C$_2$H$_5$ | —CH$_3$ | —CO$_2$CH$_3$ |
| (1-42) | —(CH$_2$)$_4$CH$_3$ | —CH$_3$ | —CO$_2$CH$_3$ |
| (1-43) | —CH$_3$ | —CH$_3$ | —CO$_2$C$_2$H$_5$ |
| (1-44) | —CH$_3$ | —CH$_3$ | —CO$_2$CH(CH$_3$)$_2$ |
| (1-45) | —CH$_3$ | —CH$_3$ | —CO$_2$(CH$_2$)$_3$CH$_3$ |

TABLE 4

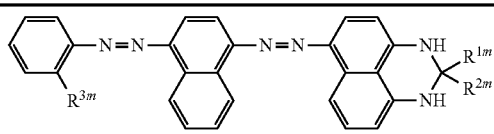

| Compound | $R^{1m}$ | $R^{2m}$ | $R^{3m}$ |
|---|---|---|---|
| (1-46) | —CH$_3$ | —CH$_3$ | —CO$_2$(CH$_2$)$_7$CH$_3$ |
| (1-47) | —CH$_3$ | —CH$_3$ | —CO$_2$(CH$_2$)$_{10}$CH$_3$ |
| (1-48) | —CH$_3$ | —CH$_3$ | —COCH$_3$ |
| (1-49) | —C$_2$H$_5$ | —CH$_3$ | —COCH$_3$ |
| (1-50) | —(CH$_2$)$_4$CH$_3$ | —CH$_3$ | —COCH$_3$ |
| (1-51) | —CH$_2$CH(CH$_3$)$_2$ | —CH$_2$CH(CH$_3$)$_2$ | —COCH$_3$ |
| (1-52) | —CH(CH$_3$)CH$_2$CH$_2$CH$_2$CH$_2$— | | —COCH$_3$ |
| (1-53) | —CH$_2$OH | —CH$_3$ | —COCH$_3$ |
| (1-54) | —CH$_2$OCOCH(C$_2$H$_5$)CH$_2$CH$_2$CH$_2$CH$_3$ | —CH$_3$ | —COCH$_3$ |
| (1-55) | —CH$_2$OH | —CH$_2$OH | —COCH$_3$ |
| (1-56) | —CH$_2$OCOCH(CH$_3$)$_2$ | —CH$_2$OCOCH(CH$_3$)$_2$ | —COCH$_3$ |
| (1-57) | —CH$_3$ | —CH$_3$ | —COCH(CH$_3$)$_3$ |
| (1-58) | —CH$_3$ | —CH$_3$ | —CO(CH$_2$)$_{10}$CH$_3$ |
| (1-59) | —CH$_3$ | —CH$_3$ | —COPh |
| (1-60) | —CH$_3$ | —CH$_3$ | —COPh |
| (1-61) | —CH$_2$CN | —CH$_3$ | —Cl |
| (1-62) | —CH$_2$CONH$_2$ | —CH$_3$ | —Cl |
| (1-63) | —CH$_2$CONHPh | —CH$_3$ | —Cl |
| (1-64) | —CH$_2$Ph | —CH$_3$ | —Cl |

The content of the dye in the colored resin particles is preferably 10 to 90 mass %, more preferably 15 to 80 mass %, even more preferably 20 to 75 mass %, and particularly preferably 25 to 70 mass % to secure color developability and dyeing fastness.

<Oily Organic Solvent>

The colored resin particles of the present invention may further contain an oily organic solvent.

The oily organic solvent refers to an organic solvent whose aqueous solubility at 20° C. is 10 mass % or less. The aqueous solubility of the oily organic solvent at 20° C. is preferably 5 mass % or less, and more preferably 1 mass % or less. The reason for this is that the oil (organic component) and water are less likely to mix during emulsification, and thus synthesis suitability and stability of the particles are improved.

The oily organic solvent is preferably non-volatile.

The oily organic solvent preferably has a boiling point of 180° C. or higher from the viewpoint of non-volatility during the reaction and dispersion stability of the colored resin particle dispersion or the ink during storage.

In the present invention, the boiling point can be measured by a general distillation method at atmospheric pressure. The boiling point in the specification is a value of the boiling point under standard conditions (1 atm, 25° C.).

1 atm equals 101.325 kPa.

Specific examples of the oily organic solvent include non-halogen phosphate esters (for example, TCP manufactured by DAIHACHI CHEMICAL INDUSTRY CO., LTD.), alkyl group-substituted aromatic compounds (for example, alkene KS-41 manufactured by JXTG Energy Corporation and KMC500 manufactured by Kureha Chemical Industry Co., Ltd.), long-chain alkyl group-substituted ester compounds (for example, methyl laurate KS-33 manufactured by NOF Corporation and tris(2-ethylhexanoic acid)glycerol manufactured by FUJIFILM Wako Pure Chemical Corporation), dibasic acid esters (for example DBE manufactured by INVISTA, and dimethyl succinate, dimethyl glutarate, and diisopropyl succinate manufactured by TOKYO CHEMICAL INDUSTRY), and alkylene glycol derivatives (for example, ethylene glycol monobutyl ether acetate, diethylene glycol monobutyl ether acetate, diethylene glycol dibutyl ether, and diethylene glycol dibenzoate manufactured by TOKYO CHEMICAL INDUSTRY).

From the viewpoint of solubility of the dye represented by Formula (M-A), DBE, dimethyl succinate, dimethyl glutarate, diisopropyl succinate, tris(2-ethylhexanoic acid)glycerol, diethylene glycol monobutyl ether acetate, and diethylene glycol dibutyl ether are particularly preferable.

In a case where the colored resin particles contain an oily organic solvent, the content of the oily organic solvent is preferably 0.1 to 20 mass %, more preferably 1 to 15 mass %, and even more preferably 3 to 10 mass % with respect to the solid content of the colored resin particles.

<<Water>>

The colored resin particle dispersion according to the embodiment of the present invention contains water. The water is not particularly limited. Pure water such as ion exchange water, ultrafiltered water, reverse osmosis water, or distilled water, or ultrapure water can be used, and ultrapure water is more preferably used.

The water content in the colored resin particle dispersion is preferably 40 to 80 mass %, more preferably 45 to 75 mass %, and particularly preferably 50 to 75 mass %. In a case where the water content is within the above range, the colored resin particle dispersion and the ink has excellent stability (precipitation or the like is unlikely to occur), and has excellent jetting stability as an inkjet ink.

[Method of Manufacturing Colored Resin Particle Dispersion]

A method of manufacturing the colored resin particle dispersion according to the embodiment of the present invention is not particularly limited, and preferably has a step of forming colored resin particles by mixing and emulsifying an oil phase component containing the water-insoluble chain polymer, the specific dye, and an organic solvent, and a water phase component containing water.

The method of manufacturing the colored resin particle dispersion particularly preferably includes the following steps (1) and (2) as the step of forming colored resin particles.

Step (1): a step of obtaining an emulsion by emulsifying a mixture containing the specific dye, the water-insoluble chain polymer, water, and an organic solvent.

Step (2): a step of removing the organic solvent from the emulsion obtained in the step (1).

The mass ratio of the content of the water-insoluble chain polymer to the content of the specific dye in the mixture of the step (1) is preferably 0.1 to 2.5.

In the step of forming colored resin particles, the oil phase component and the water phase component described above are mixed, and the obtained mixture is emulsified to form colored resin particles. The formed colored resin particles function as a dispersoid in the ink to be manufactured.

The water in the water phase component functions as a dispersion medium in the ink to be manufactured.

Examples of the organic solvent contained in the oil phase component include ethyl acetate and methyl ethyl ketone.

At least a part of the organic solvent is preferably removed in the course of the formation of the colored resin particles and after the formation of the colored resin particles.

In a case where the colored resin particles further contain an oily organic solvent, the oily organic solvent is preferably contained in the oil phase component.

The components to be contained in the oil phase component may be simply mixed. All the components may be mixed at once, or the components may be mixed in multiple stages.

The water phase component is not particularly limited as long as it contains water, and may be merely water.

From the viewpoint of storage stability and jetting stability of the ink, it is preferable that an emulsifier (surfactant) is substantially not used during the manufacturing of the colored resin particle dispersion. That is, the emulsion of the step (1) preferably contains substantially no emulsifier, and the content of the emulsifier in the emulsion is preferably 0.01 mass % or less with respect to the total mass of the emulsion.

At least one of the oil phase component or the water phase component may contain a basic compound as a neutralizing agent for an unneutralized anionic group (carboxyl group, sulfo group, phosphate group, phosphonate group, sulfate group, and the like). Accordingly, in the course of the formation of the colored resin particles, a neutralized anionic group (that is, an anionic group in the form of salt; for example, a salt of a carboxyl group, a salt of a sulfo group, a salt of a phosphate group, a salt of a phosphonate group, and a salt of a sulfate groups, and the like) can be formed.

In a case where the basic compound (neutralizing agent) is used, the basic compound (neutralizing agent) is preferably contained in at least the water phase component.

Examples of the basic compound include inorganic bases such as sodium hydroxide and potassium hydroxide, and organic bases such as triethylamine. Among these, inorganic bases such as sodium hydroxide and potassium hydroxide are preferable as the basic compound.

Examples of the salt in the anionic group in the form of salt include alkali metal salts such as sodium salt and potassium salt; and organic amine salts such as triethylamine salt. Among these, alkali metal salts such as sodium salt and potassium salt are preferable as the salt in the anionic group in the form of salt.

In the step of forming colored resin particles, the method of mixing the oil phase component and the water phase component is not particularly limited, and examples thereof include mixing by stirring.

In the step of forming colored resin particles, the emulsification method is not particularly limited, and examples thereof include emulsification by an emulsification device (for example, a disperser) such as a homogenizer.

The rotation speed of the disperser in the emulsification is, for example, 5,000 rpm to 20,000 rpm, and preferably 10,000 rpm to 15,000 rpm.

The rotation time in the emulsification is, for example, 1 minute to 120 minutes, preferably 3 minutes to 60 minutes, more preferably 3 minutes to 30 minutes, and even more preferably 5 minutes to 15 minutes.

The emulsification in the step of forming colored resin particles may be performed under heating.

By performing the emulsification under heating, the colored resin particles can be more efficiently formed.

In addition, by performing the emulsification under heating, at least a part of the organic solvent in the oil phase component is easily removed from the mixture.

In a case where the emulsification is performed under heating, the heating temperature is preferably 35° C. to 70° C., and more preferably 40° C. to 60° C.

The step of forming colored resin particles may include an emulsification stage for emulsifying the mixture (at a temperature lower than 35° C., for example) and a heating stage for heating the emulsion obtained by the emulsification stage (at a temperature higher than 35° C., for example).

In an aspect in which the emulsification stage and the heating stage are included, the colored resin particles can be more efficiently formed, particularly in the heating stage.

In addition, in an aspect in which the emulsification stage and the heating stage are included, at least a part of the organic solvent in the oil phase component can be easily removed from the mixture, particularly in the heating stage.

The heating temperature in the heating stage is preferably 35° C. to 70° C., and more preferably 40° C. to 60° C.

The heating time in the heating stage is preferably 6 hours to 50 hours, more preferably 12 hours to 40 hours, and even more preferably 15 hours to 35 hours.

[Ink]

An ink according to the embodiment of the present invention contains the above-described colored resin particle dispersion.

The content of the colored resin particle dispersion in the ink according to the embodiment of the present invention is preferably 1 to 20 mass %, more preferably 1 to 15 mass %, and even more preferably 3 to 10 mass %.

<Aqueous Organic Solvent>

The ink according to the embodiment of the present invention preferably contains an aqueous organic solvent.

The aqueous organic solvent preferably has an aqueous solubility at 25° C. of 10 g/100 g-$H_2O$ or greater, and more preferably 20 g/100 g-$H_2O$ or greater, and is particularly preferably miscible with water at an optional ratio. Examples of the aqueous organic solvent include an alcohol-based solvent, an amide-based solvent, and a nitrile-based solvent, and an alcohol-based solvent and an amide-based solvent are preferable. For example, methanol, ethanol, n-propanol, isopropanol, n-butanol, isobutanol, tert-butanol, trimethylolpropane, ethylene glycol, diethylene glycol, triethylene glycol, polyethylene glycol, propylene glycol, butylene glycol, 1,2,6-hexanetriol, thioglycol, hexylene glycol, glycerin, diglycerin, 2-pyrrolidone, N-methyl-2-pyrrolidone, 1,5-pentanediol, 1,6-hexanediol, ethylene glycol monoethyl ether, ethylene glycol monobutyl ether, and acetonitrile can be mentioned. Preferred is trimethylolpropane, ethylene glycol, diethylene glycol, triethylene glycol, tetraethylene glycol, propylene glycol, glycerin, 2-pyrrolidone, 1,5-pentanediol, 1,6-hexanediol, or ethylene glycol monobutyl ether; more preferred is ethylene glycol, diethylene glycol, triethylene glycol, propylene glycol, glycerin, 2-pyrrolidone, ethylene glycol monobutyl ether, or tetraethylene glycol; and particularly preferred is ethylene glycol, glycerin, 2-pyrrolidone, or tetraethylene glycol.

The content of the aqueous organic solvent in the ink is preferably 5 to 50 mass %, more preferably 5 to 40 mass %, and even more preferably 10 to 30 mass %. In a case where the aqueous organic solvent content is within the above range, a printing inkjet ink has excellent stability (precipitation is unlikely to occur), and has excellent jetting stability as an inkjet ink.

Moreover, the following aqueous organic solvent (b1) can also be used as an aqueous organic solvent.

<Aqueous Organic Solvent (b1)>

In this specification, the aqueous organic solvent (b1) refers to an aqueous organic solvent in which the water-insoluble chain polymer has a solubility of 0.05 mass % or greater, and which is an ether or an amide and has a boiling point of 287° C. or higher.

The aqueous organic solvent (b1) preferably has an aqueous solubility at 25° C. of 10 g/100 g-$H_2O$ or greater, and more preferably 20 g/100 g-$H_2O$ or greater, and is particularly preferably miscible with water at an optional ratio.

The solubility of the water-insoluble chain polymer in the aqueous organic solvent (b1) is preferably 0.05 mass % or greater since the color density can be improved. In a case where the solubility is 0.05 mass % or greater, the color density can be dramatically improved in heat fixing after printing on a fabric by an inkjet method.

The solubility of the water-insoluble chain polymer in the aqueous organic solvent (b1) is preferably 5 mass % or less, and more preferably 1 mass % or less.

The solubility can be measured by a general method, but in the present invention, it can be measured by the following method. The measurement of the solubility of the water-insoluble chain polymer is performed with water-insoluble chain polymer particles produced without adding a dye in the production of the colored resin particles. An aqueous dispersion of water-insoluble chain polymer particles is naturally left on a petri dish at 25° C. and dried until there is no decrease in mass. 100 g of an aqueous organic solvent is weighed in a glass vial, and the water-insoluble chain polymer solid obtained as above is added thereto. An ultrasonic cleaning device (manufactured by AS ONE Corporation, 1-6900-01) applies ultrasonic waves to the mixture for 30 minutes to visually evaluate the presence or absence of dissolution. The weighed value of the water-insoluble chain polymer solid is appropriately changed, and the solubility (mass %) is calculated from the weighed value of the maximum amount of the solid which completely dissolves and the mass of the aqueous organic solvent.

In a case where the boiling point of the aqueous organic solvent (b1) is 287° C. or higher, the color density can be improved. The reason for this is thought to be that the higher the boiling point, the lower the volatilization rate of the aqueous organic solvent during the heat fixing, and the longer the time for the water-insoluble chain polymer and the aqueous organic solvent to be sufficiently compatible with each other. In addition, the higher the boiling point, the greater the continuous jetting property, and the reason for this is presumed to be that the drying on the inkjet nozzle surface is suppressed.

In the present invention, the boiling point can be measured by a general distillation method at atmospheric pressure. The boiling point in the specification is a value of the boiling point under standard conditions (1 atm, 25° C.).

1 atm equals 101.325 kPa.

The content of the aqueous organic solvent (b1) is preferably 25 to 45 mass %, and more preferably 30 to 40 mass % with respect to the total mass of the ink.

The aqueous organic solvent (b1) is not particularly limited as long as it satisfies the above-described characteristics. From the viewpoint of jetting property in the inkjet method and easy volatilization during the heat fixing, triethylene glycol, tetraethylene glycol, polyethylene glycol (having a molecular weight of 400 to 800, for example), hydroxyethylpyrrolidone, hydroxypropylpyrrolidone, valerolactam, caprolactam, heptalactam, polyethylene glycol monomethyl ether (having a molecular weight of 400), polyethylene glycol monomethyl ether (having a molecular weight of 550), polyethylene glycol dimethyl ether (having a molecular weight of 500), tripropylene glycol, tetrapropylene glycol, polypropylene glycol (having a molecular weight of 400), polypropylene glycol (having a molecular weight of 600), polypropylene glycol (having a molecular weight of 700), and SURFYNOL 465 (manufactured by Nissin Chemical Co., Ltd.) and the like are preferable.

<Crosslinking Agent>

The ink according to the embodiment of the present invention may further contain a crosslinking agent.

The crosslinking agent is preferably a compound having at least two crosslinkable groups.

The crosslinkable group of the crosslinking agent is preferably a carboxyl group, a hydroxyl group, a sulfonate group, an amide group, or the like.

Examples of the crosslinking agent include blocked isocyanate-based compounds, oxazoline-based compounds, and carbodiimide compounds. Among these, blocked isocyanate-based compounds in which a trimethylolpropane (TMP) adduct or isocyanurate of hexamethylene diisocyanate (HDI), hydrogenated xylylene diisocyanate (H6XDI), isophorone diisocyanate (IPDI), or dicyclohexylmethane diisocyanate (H12MDI) is blocked with a blocking agent, and carbodiimide compounds are preferable. As the blocking agent, diethyl malonate (DEM), diisopropylamine (DIPA), 1,2,4-triazole (TRIA), 3,5-dimethylpyrazole (DMP), or butanone oxime (MEKO) can be preferably used in view of a dissociation temperature of the blocking agent. These blocked isocyanate-based compounds can also be used as an oligomer in which a part of the isocyanate group thereof is reacted with a polyol, a polycarbonate, a polyester, a polyether, or the like.

As the carbodiimide compounds, crosslinking agents CARBODILITE E-02, E-03A, and E-05 (all are product names) for an aqueous resin manufactured by Nisshinbo Chemical Inc. are preferable, and E-05 is particularly preferable from the viewpoint of storage stability and reactivity.

The crosslinking agent particles preferably have an average particle diameter of 200 nm or less from the viewpoint of improving the jetting property in an inkjet process. A value of a volume average particle diameter (MV) measured using a particle size distribution measurement apparatus (NANOTRAC UPA EX150, manufactured by Nikkiso Co., Ltd., trade name) can be used as the average particle diameter.

The dissociation temperature of the crosslinking agent is preferably as low as possible from the viewpoint of crosslinking efficiency, but is preferably as high as possible from the viewpoint of storage stability. The dissociation temperature can be selected by appropriately balancing the crosslinking efficiency and the storage stability. The dissociation temperature is preferably in the range of 90° C. to 180° C., more preferably in the range of 90° C. to 120° C., and particularly preferably in the range of 110° C. to 120° C.

The crosslinking agent is preferably blended with the ink as what is water-soluble or self-emulsifiable by giving a hydrophilic group. In this state, the viscosity of the blended ink can be lowered, and excellent redispersibility can be obtained.

The crosslinking agent particles are not particularly limited, and examples thereof include ELASTRON BN-77 (blocked isocyanate, particle diameter: 19 nm, dissociation temperature: 120° C. or higher, manufactured by DKS Co. Ltd.), ELASTRON BN-27 (blocked isocyanate, particle diameter: 108 nm, dissociation temperature: 180° C. or higher, manufactured by DKS Co. Ltd.), DURANATE WM44-70G (blocked isocyanate, particle diameter: 42 nm, dissociation temperature: about 90° C., manufactured by Asahi Kasei Corporation), and TRIXENE AQUA B1200 (blocked isocyanate, particle diameter: 94 nm, dissociation temperature: 110° C. to 120° C., manufactured by BAXENDEN).

The content of the crosslinking agent in the ink is preferably 0.1 to 10 mass %, more preferably 0.5 to 8 mass %, and even more preferably 1 to 5 mass %.

<Pigment>

The ink according to the embodiment of the present invention may further contain a pigment. The pigment is preferably dispersed in the ink according to the embodiment of the present invention.

A polymer preferably forms a film on a fabric in an inkjet printing method according to the embodiment of the present invention since the pigment is further dispersed in the film depending on colors, and it is thus possible to adjust the hue or to increase the color density. Only one type of pigment may be used, or two or more types of pigments may be used.

The pigment which can be used in the present invention is not particularly limited, and is preferably at least one type selected from Carbon Black Aniline Black C. I. Pigment Yellow 3, 12, 53, 55, 74, 81, 83, 93, 94, 95, 97, 98, 100, 101, 104, 108, 109, 110, 117, 120, 128, 138, 153, 155, 180, and 185, C. I. Pigment Red 112, 114, 122, 123, 146, 149, 166, 168, 170, 172, 177, 178, 179, 185, 190, 193, 202, 206, 209, and 219, C. I. Pigment Violet 19 and 23, C. I. Pigment Orange 36, 43, and 64, C. I. Pigment Blue 15, 15:1, 15:2, 15:3, 15:4, 15:6, 16, 17:1, 56, 60, and 63, or C. I. Pigment Green 36.

In a case where the ink according to the embodiment of the present invention contains a pigment, the pigment content in the ink is preferably 0.5 to 10 mass %, more preferably 0.5 to 8 mass %, and even more preferably 0.5 to 5 mass %.

In the present invention, an aqueous dispersion of a pigment (also referred to as "aqueous pigment dispersion") in which a pigment is dispersed in water using a dispersant can also be used in the preparation of the printing inkjet ink. For example, the pigment dispersion described in JP2012-007148A can be used as the aqueous pigment dispersion. In addition, a commercially available product such as Pro-jet Black APD1000 (manufactured by Fujifilm Imaging Colorants) can be used as the aqueous pigment dispersion.

A self-dispersing pigment can also be used as the pigment.

The self-dispersing pigment is a pigment which is dispersible in water without using a dispersant. Examples of the self-dispersing pigment include those in which at least one of hydrophilic groups such as a carbonyl group, a hydroxyl group, a carboxyl group, a sulfo group, and a phosphate group or salts thereof is introduced to the surface of the pigment by a chemical bond, either directly or via another group.

The self-dispersing pigment is preferably self-dispersing carbon black.

Examples of the useable self-dispersing pigment include commercially available products such as self-dispersing carbon black CAB-O-JET 200, 300, and 400 (all manufactured by Cabot Corporation), BONJET CW-1 (500 μmol/g, as a carboxyl group) and CW-2 (470 μmol/g, as a carboxyl group) (all manufactured by Orient Chemical Industries Co., Ltd.), and Aqua-Black 162 (about 800 μmol/g, as a carboxyl group) of Tokai Carbon Co., Ltd.

As the pigment, either an aqueous dispersion of a pigment obtained by dispersing a pigment in water using a dispersant or a self-dispersing pigment can be preferably used.

<Wax>

The ink according to the embodiment of the present invention may contain wax. Accordingly, the friction resistance of a surface of an ink film to be obtained can be reduced, and the frictionality can be improved.

The wax is preferably present in the form of particles in the ink according to the embodiment of the present invention. The wax having a particle form is referred to as "wax particles".

A dispersion in which a wax is dispersed in water is preferably used as the wax particles. As the wax, polyethylene (also expressed as olefin), paraffin, and carnauba (also expressed as ester) are preferred, and carnauba is more preferred from the viewpoint of improving the frictionality and the color density. These may be used alone or in combination of two or more types thereof. Two or more types may be used as particles of the mixture.

Regarding the dispersion form of the wax particles, the wax particles are preferably either anionic or nonionic, and are particularly preferably nonionic. In the present invention, the wax particles are preferably nonionic since it is thought that the wax is likely to be unevenly distributed on the surface of the ink film, but the frictionality is effectively improved. Generally, in a case where the printing inkjet ink contains a colorless component other than the coloring agent, the interaction between the coloring agent and the pretreatment agent on the fabric may be inhibited, and the color density may be deteriorated. It is presumed that the deterioration of the color density can be suppressed using nonionic wax particles.

The melting point of the wax is preferably in the range of 60° C. to 120° C., and more preferably 60° C. to 100° C. from the viewpoint of improving stability and frictionality. It is possible to improve the stability of the printing ink by increasing the melting point, and not increasing the melting point higher than necessary is effective in improving the frictionality.

The melting point of the wax can be measured by a general melting point measuring machine.

The volume average particle diameter (MV) of the wax particles is preferably 0.3 μm or less, more preferably 0.2 μm or less, and particularly preferably 0.1 μm or less from the viewpoint of improving the jetting property in an inkjet process.

The volume average particle diameter can be measured in the same manner as in the case of the colored resin particles described above.

The wax content is preferably 0.1 to 10 mass %, more preferably 0.5 to 8 mass %, and even more preferably 1 to 5 mass % in the printing inkjet ink.

The wax particles are not particularly limited, and a commercially available product may be used. Examples thereof include Polylon L-787 (manufactured by Chukyo Yushi Co., Ltd., polyethylene, nonionic, melting point: 102° C., volume average particle diameter: 0.1 μm), Hydrin-703 (manufactured by Chukyo Yushi Co., Ltd., paraffin, anion, melting point: 75° C., volume average particle diameter: 0.1 μm), R108 (manufactured by Chukyo Yushi Co., Ltd., paraffin, nonionic, melting point: 66° C., volume average particle diameter: 0.2 μm), and Cellosol 524 (manufactured by Chukyo Yushi Co., Ltd., carnauba, nonionic, melting point: 83° C., volume average particle diameter 0.07 μm). More preferable are R108 (manufactured by Chukyo Yushi Co., Ltd., paraffin, nonionic, melting point: 66° C., volume average particle diameter: 0.2 μm) and Cellosol 524 (manufactured by Chukyo Yushi Co., Ltd., carnauba, nonionic, melting point: 83° C., volume average particle diameter 0.07 μm), and particularly preferable is Cellosol 524 (manufactured by Chukyo Yushi Co., Ltd., carnauba, nonionic, melting point: 83° C., volume average particle diameter 0.07 μm).

<Other Components>

The ink according to the embodiment of the present invention may contain components other than those described above.

Examples of other components include coloring agents other than the above dyes and pigments, organic solvents, surfactants, pH adjusters, fluorescent brighteners, surface tension adjusters, antifoaming agents, antidrying agents, lubricants, thickeners, ultraviolet absorbers, antifading agents, antistatic agents, matting agents, antioxidants, resistivity modifiers, rust inhibitors, inorganic pigments, reduction inhibitors, preservatives, fungicides, and chelating agents. As the above components, those described in WO2017/131107A can be preferably used.

The surfactant is not particularly limited, and examples thereof are as follows.

(Nonionic Acetylene-Based Surfactant Exhibiting HLB of 3 to 8)

The ink according to the embodiment of the present invention may contain a nonionic acetylene-based surfactant exhibiting an HLB of 3 to 8 (hereinafter, also referred to as "(c) component" or "(c) surfactant").

The HLB of (c) component is 3 to 8, preferably 4 to 6, and more preferably 4. Hydrophile-lipophile-balance (HLB) is an index that represents a hydrophilic-lipophilic balance, and is described in Handbook of Surfactants (p. 234, KOGAKUTOSHO, etc.). The HLB is in the range of 3 to 8 since both the continuous jetting property and the intermittent jetting property can be satisfied.

In the present invention, (c) surfactant is a nonionic acetylene-based surfactant. Surfactants are classified into anionic surfactants, cationic surfactants, and nonionic surfactants from the viewpoint of charge, and a nonionic surfactant is used as (c) surfactant of the present invention in view of the stability of the colored resin particle dispersion. In addition, surfactants are classified into acetylene-based surfactants and non-acetylene-based surfactants from the viewpoint of structure. An acetylene-based surfactant is used as (c) surfactant of the present invention from the viewpoint of continuous jetting property and intermittent jetting property.

In the present invention, (c) surfactant is an acetylene-based surfactant, and specifically, a surfactant having an acetylene bond.

Examples of (c) surfactant include linear surfactants and branched (geminal) surfactants. Branched surfactants are more preferable since these rapidly produce a response from the viewpoint of handling a high-speed inkjet process.

The content of (c) surfactant is preferably 0.1 to 2.0 mass %, and more preferably 0.5 to 2.0 mass % with respect to the total mass of the ink.

From the viewpoint of sufficiently obtaining the continuous jetting property and the intermittent jetting property, the content of (c) surfactant is preferably 0.1 mass % or greater with respect to the total mass of the ink, and from the viewpoint of sufficiently obtaining the continuous jetting property and the intermittent jetting property, the content of (c) surfactant is preferably 2.0 mass % or less with respect to the total mass of the ink.

Examples of (c) surfactant are not particularly limited, and include Surfynol DF110D (HLB3, manufactured by Nissin Chemical Co., Ltd.), Surfynol 104E (HLB4, manufactured by Nissin Chemical Co., Ltd.), Surfynol 104H (HLB4, manufactured by Nissin Chemical Co., Ltd.), Surfynol 104A (HLB4, manufactured by Nissin Chemical Co., Ltd.), Surfynol 104PA (HLB4, manufactured by Nissin Chemical Co., Ltd.), Surfynol 104PG50 (HLB4, manufactured by Nissin Chemical Co., Ltd.), Surfynol 104S (HLB4, Nissin Chemical Co., Ltd.), Surfynol 420 (HLB4, manufactured by Nissin Chemical Co., Ltd.), Surfynol 82 (HLB4, manufactured by Nissin Chemical Co., Ltd.), Surfynol SE (HLB6, manufactured by Nissin Chemical Co., Ltd.), Surfynol SE-F (HLB6, manufactured by Nissin Chemical Co., Ltd.), Surfynol 61 (HLB6, manufactured by Nissin Chemical Co., Ltd.), Surfynol 440 (HLB8, manufactured by Nissin Chemical Co., Ltd.), and Surfynol 2502 (HLB8, Nissin Chemical Co., Ltd.). More preferred are Surfynol 104E (HLB4, manufactured by Nissin Chemical Co., Ltd.), Surfynol 104H (HLB4, manufactured by Nissin Chemical Co., Ltd.), Surfynol 104A (HLB4, manufactured by Nissin Chemical Co., Ltd.), Surfynol 104PA (HLB4, manufactured by Nissin Chemical Co., Ltd.), Surfynol 104PG50 (HLB4, manufactured by Nissin Chemical Co., Ltd.), Surfynol 104S (HLB4, Nissin Chemical Co., Ltd.), Surfynol 420 (HLB4, manufactured by Nissin Chemical Co., Ltd.), Surfynol 82 (HLB4, manufactured by Nissin Chemical Co., Ltd.), Surfynol SE (HLB6, manufactured by Nissin Chemical Co., Ltd.), Surfynol SE-F (HLB6, manufactured by Nissin Chemical Co., Ltd.), and Surfynol 61 (HLB6, manufactured by Nissin Chemical Co., Ltd.), and particularly preferred are Surfynol 104E (HLB4, manufactured by Nissin Chemical Co., Ltd.), Surfynol 104H (HLB4, manufactured by Nissin Chemical Co., Ltd.), Surfynol 104A (HLB4, manufactured by Nissin Chemical Co., Ltd.), Surfynol 104PA (HLB4, manufactured by Nissin Chemical Co., Ltd.), Surfynol 104PG50 (HLB4, manufactured by Nissin Chemical Co., Ltd.), Surfynol 104S (HLB4, Nissin Chemical Co., Ltd.), Surfynol 420 (HLB4, manufactured by Nissin Chemical Co., Ltd.), and Surfynol 82 (HLB4, manufactured by Nissin Chemical Co., Ltd.).

In a case where the ink according to the embodiment of the present invention is used as an inkjet ink, the surface tension of the ink is preferably adjusted to 20 mN/m to 70 mN/m, and more preferably 25 adjusted to mN/m to 60 mN/m. In a case where the ink is used as an inkjet ink, the ink viscosity is preferably adjusted to 40 mPa·s or less, more preferably 30 mPa·s or less, and particularly preferably 20 mPa·s or less. The viscosity is measured by controlling the temperature to 25° C. using an E-type rotating viscometer.

The surface tension and the viscosity can be adjusted by adding various additives such as a viscosity adjuster, a surface tension adjuster, a resistivity modifier, a film conditioning agent, an ultraviolet absorber, an antioxidant, an antifading agent, a fungicide, a rust inhibitor, a dispersant, and a surfactant.

The ink (preferably inkjet ink) according to the embodiment of the present invention is preferably a printing ink.

The ink according to the embodiment of the present invention is more preferably a printing inkjet ink for printing on a fabric by an inkjet method.

Since the printing inkjet ink according to the embodiment of the present invention can be directly printed without blurring on a fabric not coated with a pretreatment agent, it is useful from the viewpoint of workability.

<Ink Preparation Method>

The method of preparing the ink according to the embodiment of the present invention is not particularly limited. Examples thereof include a method of preparing an ink by mixing the colored resin particle dispersion with an aqueous organic solvent, water, an optional surfactant, and the like.

[Ink Set]

An ink set according to the embodiment of the present invention contains at least a black ink, a yellow ink, a magenta ink, and a cyan ink, and at least one ink of the ink sets is the ink according to the embodiment of the present invention.

In the ink set according to the embodiment of the present invention, the black ink is preferably the ink according to the embodiment of the present invention.

The ink set according to the embodiment of the present invention is preferably an inkjet printing ink.

[Inkjet Printing Method]

An inkjet printing method according to the embodiment of the present invention includes a step of directly printing the ink according to the embodiment of the present invention on a fabric by an inkjet method.

In the inkjet printing method according to the embodiment of the present invention, the fabric may be pretreated with an aqueous pretreatment liquid containing a coagulating agent. That is, the inkjet printing method according to the embodiment of the present invention may have a pretreatment step of applying an aqueous pretreatment liquid containing a coagulating agent to a fabric to obtain a pretreated fabric.

In the present invention, "directly printing" a printing inkjet ink on a fabric by an inkjet method refers to a case in which a transfer step is not required, and a step of applying a printing paste is not required, such that the printing inkjet ink is directly printed on the fabric.

The inkjet printing method according to the embodiment of the present invention is a simple method without producing waste water and waste materials such as transfer paper and is useful.

(Pretreatment Step)

The pretreatment step is a step of obtaining a pretreated fabric by applying an aqueous pretreatment liquid containing a coagulating agent to a fabric. The method of applying an aqueous pretreatment liquid to the fabric is not particularly limited, and examples thereof include a coating method, a padding method, an inkjet method, a spraying method, and a screen printing method.

The coagulating agent contained in the aqueous pretreatment liquid is not particularly limited as long as it acts to coagulate the colored resin particles. The coagulating agent is preferably at least one selected from an organic acid, a polyvalent metal salt, and a cationic compound.

Particularly, in a case where the coagulating agent is a cationic compound or a polyvalent metal salt and the polymer in the colored resin particles has an anionic group (preferably an acidic group, and more preferably a carboxyl group), a high-concentration colored fabric can be obtained by printing through the inkjet printing method. The reason for this is thought to be that the pretreated cationic compound or polyvalent metal salt coagulates when coming into contact with an ink containing a polymer having an anionic group, and thus stays on a surface of the fabric, and as a result, the amount of the colored resin particles present on the surface is increased and the concentration can be increased. The coagulating agent is more preferably a cationic compound.

<<Polyvalent Metal Salt>>

The polyvalent metal salt is a compound composed of a di- or higher-valent metal ion and an anion. Specific examples thereof include calcium chloride, calcium nitrate, calcium sulfate, calcium acetate, calcium hydroxide, calcium carbonate, magnesium chloride, magnesium acetate, magnesium sulfate, magnesium carbonate, barium sulfate, barium chloride, zinc sulfide, zinc carbonate, and copper nitrate.

<<Cationic Compound>>

The cationic compound is not particularly limited, and may be a low-molecular-weight compound or a polymer compound.

Examples of the low-molecular-weight cationic compound include (2-hydroxyethyl)trimethylammonium chloride, benzoylcholine chloride, benzyltriethylammonium chloride, trimethylacetohydrazide ammonium chloride, 1-butyl-1-methylpyrrolidinium chloride, 3-hydroxy-4-(trimethylammonio)butyrate hydrochloride, glycidyltrimethylammonium chloride, and L-carnitine hydrochloride.

Examples of the cationic polymer compound include water-soluble cationic polymers which are positively charged in water, such as polyallylamine or derivatives thereof, amine-epihalohydrin copolymers, or other quaternary ammonium salt type cationic polymers. In some cases, a water-dispersible cationic polymer can also be used.

Coagulating agents may be used alone or in combination of two or more types thereof.

The aqueous pretreatment liquid may contain, for example, a crosslinking agent, a surfactant, a resin, and the like other than water and an aqueous organic solvent. Examples of the aqueous organic solvent and the crosslinking agent which may be contained in the aqueous pretreatment liquid include those described above that may be contained in the ink according to the embodiment of the present invention.

<<Solvent>>

The aqueous pretreatment liquid preferably contains a solvent (organic solvent). The organic solvent is not particularly limited, and examples thereof include glycerin, diethylene glycol, 1,3-propanediol, triethylene glycol, 2-pyrrolidone, tetraethylene glycol, tetraethylene glycol monomethyl ether, and tetraethylene glycol monobutyl ether.

<Heat Treatment Step>

The inkjet printing method according to the embodiment of the present invention preferably further includes a heat treatment step. The water-insoluble chain polymer easily forms a film by performing the heat treatment step after printing on the fabric.

The heat treatment step is preferably performed by heating the colored fabric.

The temperature in the heat treatment step is preferably 100° C. to 220° C., and more preferably 130° C. to 200° C. The heating time in the heat treatment step is preferably 20 seconds to 300 seconds, more preferably 30 to 240 seconds, and even more preferably 40 to 180 seconds.

<Post-Treatment>

In the fabric colored with the printing inkjet ink according to the embodiment of the present invention, a padding treatment is optionally performed on the entire surface of the colored fabric with a post-treatment agent, and thus it is possible to obtain a colored fabric having further improved soft texture and fastness (particularly rub resistance). Examples of the post-treatment agent for softening include a cationic surfactant, an anionic surfactant, a nonionic surfactant, a dimethyl silicone oil, an amino silicone oil, a carboxy-modified silicone oil, a hydroxy-modified silicone oil, a fatty acid, a fatty acid amide, a mineral oil, a vegetable oil, an animal oil, and a plasticizer.

Examples of the post-treatment agent for improving the slipperiness of the colored fabric surface include a metallic soap, a paraffin wax, a carnauba wax, a microcrystalline wax, a dimethyl silicone oil, an amino silicone oil, a carboxy-modified silicone oil, and a hydroxy-modified silicone oil.

In the padding treatment, the post-treatment agent is emulsified, thermally emulsified, or dispersed in a water solvent by stirring with a mixer. In the resulting material, a colored fabric is immersed. The fabric is squeezed and dried by a mangle or the like, and heat-treated.

In addition, the rub resistance of a colored fabric can be improved by blending a small amount of a resin emulsion as a fixing agent in the post-treatment agent. The blending amount of the resin emulsion with respect to the post-treatment agent is preferably less than 5% since the soft texture of the colored fabric is not easily impaired.

The resin emulsion to be blended as a fixing agent in the post-treatment agent is not particularly limited, and an acrylic acid ester resin emulsion, a urethane resin emulsion, an ethylene-vinyl acetate copolymer resin (EVA resin) emulsion, a silicone-acrylic resin emulsion, a polyester resin emulsion, or the like can be used. In order to soften the texture of the colored fabric, the glass transition point of these resin emulsions is preferably 0° C. or lower.

<Fabric>

The inkjet printing method according to the embodiment of the present invention can be applied to various types of fabrics. Examples of fabrics (fiber type) include synthetic fibers such as nylon, polyester, and acrylonitrile, semisynthetic fibers such as acetate and rayon, natural fibers such as cotton, silk, and wool, mixed fibers thereof, woven fabrics, knitted fabrics, and nonwoven fabrics, and at least one selected from cotton and polyester is preferable.

As the fabric, a pretreated fabric can also be used. The pretreatment liquid can be applied by a coating method, a padding method, an inkjet method, a spraying method, a screen printing method, or the like. Preferably, the pretreatment liquid contains a coagulating agent which coagulates the polymer in the colored resin particles, and is an aqueous solution. Examples of the coagulating agent include organic acids, polyvalent metal salts, and cationic compounds.

Examples of clothing items include T-shirts, trainers, jerseys, pants, sweatsuits, dresses, and blouses. It is also suitable for bedding, handkerchiefs, and the like.

<Plastic Base Material>

The ink according to the embodiment of the present invention is suitable for use in image formation on a plastic base material.

Examples of the plastic of the plastic base material include a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, and an acrylic resin.

The plastic base material may be corona-treated.

With the ink according to the embodiment of the present invention, an image having excellent adhesiveness can be formed not only on a general plastic base material such as a PET base material, but also on a base material in which it is difficult to secure adhesiveness to an image formed by an aqueous ink.

Examples of the base material in which it is difficult to secure adhesiveness to an image formed by an aqueous ink include a hydrophobic base material having no polar group.

Examples of the hydrophobic base material having no polar group include a PS base material, a corona-treated PP base material (may be referred to as "corona PP"), a PE base material, and a PE-laminated paper base material.

EXAMPLES

Hereinafter, the present invention will be described in greater detail with examples. The present invention is not limited to the following examples.

<Example of Monomer Synthesis>

Compounds shown in the following Tables 5 to 9 were synthesized.

TABLE 5

| Compound for Forming Unit (1) | | | |
|---|---|---|---|
| Name | Structure | Molecular Weight | Number of Cyclic Structures in One Molecule |
| IPDI | [structure] | 222.28 | 1 |
| HXDI | [structure] | 194.23 | 1 |
| HMDI | [structure] | 262.35 | 2 |
| MDI | [structure] | 250.26 | 2 |
| XDI | [structure] | 188.18 | 1 |

TABLE 6

| | Compound for Forming Unit (2) | | |
|---|---|---|---|
| Name | Structure | Molecular Weight | Number of Cyclic Structures in One Molecule |
| a-1 | HO-[cyclohexane-1,3-diyl]-CH2OH, HOCH2-[cyclohexane]-CH2OH | 144.21 | 1 |
| a-2 | HOCH2-[tricyclic decane]-CH2OH | 196.29 | 3 |
| a-3 | HO-[cyclohexyl]-C(CH3)2-[cyclohexyl]-OH | 240.39 | 2 |
| a-4 | [trimethylcyclohexane with NH2 and CH2NH2] | 170.30 | 1 |
| a-5 | HO-CH2CH2-N(piperazine)N-CH2CH2-OH | 174.24 | 1 |
| a-6 | HO-[phenyl]-[cyclohexylidene]-[phenyl]-OH | 268.36 | 3 |
| a-7 | HO-CH2CH2-O-[phenyl]-O-CH2CH2-OH | 198.22 | 1 |

TABLE 7

| | Compound for Forming Unit (2) | | |
|---|---|---|---|
| Name | Structure | Molecular Weight | Number of Cyclic Structures in One Molecule |
| a-8 | HOCH2-[phenyl]-CH2OH | 138.17 | 1 |
| a-9 | HO-CH2CH2-O-[2,6-dibromophenyl]-C(CH3)2-[2,6-dibromophenyl]-O-CH2CH2-OH | 631.98 | 2 |

TABLE 7-continued

Compound for Forming Unit (2)

| Name | Structure | Molecular Weight | Number of Cyclic Structures in One Molecule |
|---|---|---|---|
| a-10 | [structure] | 338.37 | 2 |
| a-11 | [structure] | 198.22 | 1 |
| a-12 | [structure] | 484.55 | 2 |
| a-13 | [structure] | 512.60 | 2 |

TABLE 8

Compound for Introducing Hydrophilic Group

| Name | Structure | Molecular Weight | Number of Cyclic Structures in One Molecule |
|---|---|---|---|
| DMPA | [structure] | 134.13 | 0 |
| DMBA | [structure] | 148.16 | 0 |

TABLE 9

Other Compounds

| Name | Structure | Molecular Weight | Number of Cyclic Structures in One Molecule |
|---|---|---|---|
| TMHDI | [structure] | 210.27 | 0 |
| b-1 | [structure] | 118.18 | 0 |

TABLE 9-continued

| | Other Compounds | | |
|---|---|---|---|
| Name | Structure | Molecular Weight | Number of Cyclic Structures in One Molecule |
| b-2 | HO-(CH₂)₁₂-OH (dodecanediol) | 202.34 | 0 |
| b-3 | HO-[CH(CH₃)CH₂-O]ₙ-H | Mn = 1000 | 0 |
| b-4 | 2-ethyl-2-butyl-1,3-propanediol | 160.26 | 0 |
| b-5 | glycerol 2-ethylhexyl ether | 204.31 | 0 |
| b-6 | HO-R-(O-C(=O)-O-R)ₙ-OH<br>R = C₆H₁₂, C₅H₁₀, C₄H₈<br>PCD | M = 1000 | 0 |
| b-7 | glycerol monomethacrylate | 160.17 | 0 |
| b-8 | diacrylate diether diol | 374.43 | 0 |
| TMP (for comparison examples) | trimethylolpropane | 134.18 | 0 |
| PEG (for comparison examples) | HO-(CH₂CH₂O)ₙ-H | M = 1000 | 0 |

[Synthesis of Water-Insoluble Chain Polymer and Comparative Polymer]

Polymers P1 to P43 were synthesized as water-insoluble chain polymers, and polymers R1 to R3 were synthesized as comparative polymers.

In the synthesis of the polymers, compounds for forming a unit (1), compounds for forming a unit (2), compounds for introducing a hydrophilic group, and compounds other than the above compounds shown in Tables 5 to 9 were used. The compound other than the above compounds is a diisocyanate compound other than the compound for forming a unit (1), a diol compound other than the compound for forming a unit (2), a dithiol compound, or a diamine compound.

The compounds for forming a unit (1) are all diisocyanate compounds. The compounds for forming a unit (2) are diol compounds, except for a-4. The compounds other than the above compounds are diol compounds, except for TMHDI and TMP. TMHDI is a diisocyanate compound, and a-4 is a diamine compound. TMP is a triol compound.

<Synthesis of Polymer P1> 73.4 g of isophorone diisocyanate (IPDI) as a compound for forming a unit (1), 13.4 g of a 2,2-dimethylolpropanoic acid (DMPA) as a compound for introducing a hydrophilic group, 225 g of a compound (b-6) (T5651 manufactured by ASAHI KASEI CORPORATION) other than the above compounds, and 311.8 g of ethyl acetate for adjusting the concentration of a reaction liquid to 50 mass % were put into a three-neck flask, and heated to 70° C. 0.2 g of NEOSTANN U-600 (manufactured by NITTO KASEI CO., LTD., inorganic bismuth catalyst; hereinafter also referred to as "U-600") was added thereto, and the mixture was stirred at 70° C. for 5 hours.

Next, 218.0 g of isopropyl alcohol and 197.0 g of ethyl acetate were added thereto, and the mixture was stirred at 70° C. for 3 hours. After the stirring, the reaction liquid was left to cool to room temperature (23° C.), and then the concentration thereof was adjusted with ethyl acetate to obtain a 30 mass % solution of a polymer P1 (the solvent was a mixed solution of ethyl acetate/isopropyl alcohol).

<Synthesis of Polymers P2 to P43, R1, and R2>

A 30 mass % solution of each of polymers P2 to P43, R1, and R2 was obtained in the same manner as in the synthesis of the polymer P1, except that the type and the amount of the compound for forming the polymer were changed as shown in Table 10. The stirring time before the addition of isopropyl alcohol was set such that the weight-average molecular weight described in Table 11 was reached in each case, and the reaction was carried out.

In Table 10, "N1" represents a "compound for introducing a hydrophilic group", "N2" represents a "diisocyanate compound", and "N3" represents a "diol compound, dithiol compound, or diamine compound".

<Synthesis of Polymer R3>

A 30 mass % solution of a polymer R3 was obtained in the same manner as in the synthesis of the polymer P1, except that the type and the amount of the compound for forming the polymer were changed as shown in Table 10, and isopropyl alcohol was not added after stirring at 70° C. for 5 hours.

Regarding the polymers P1 to P43 and R1 to R3, the following Tables 10 and 11 show the types and the amount of the compounds for forming a polymer used, the total amount (mass %) of at least one structural unit selected from the structural unit (1) and the structural unit (2) with respect to the total amount of the polymer, the ring value (mmol/g) of the polymer, the acid value (mmol/g) of the polymer, the weight-average molecular weight (Mw) of the polymer, and the amount (g) of the polymer dissolved in 100 g of distilled water at 25° C.

In Table 11, the ring value (mmol/g) of the polymer and the acid value (mmol/g) of the polymer are calculated values, and the weight-average molecular weight (Mw) of the polymer and the amount (g) of the polymer dissolved in 100 g of distilled water at 25° C. are actually measured values.

TABLE 10

| Polymer | Type of Compound for Forming Polymer | | | Amount of Compound for Forming Polymer Used (mmol) | | | Amount of Compound for Forming Polymer Used (g) | | |
|---|---|---|---|---|---|---|---|---|---|
| Type | N1 | N2 | N3 | N1 | N2 | N3 | N1 | N2 | N3 |
| P1 | DMPA | IPDI | b-6 | 100 | 330 | 225 | 13.4 | 73.4 | 225.0 |
| P2 | DMPA | HXDI | b-6 | 100 | 330 | 225 | 13.4 | 64.1 | 225.0 |
| P3 | DMPA | HMDI | b-6 | 100 | 330 | 225 | 13.4 | 86.6 | 225.0 |
| P4 | DMPA | MDI | b-6 | 100 | 330 | 225 | 13.4 | 82.6 | 225.0 |
| P5 | DMPA | XDI | b-6 | 100 | 330 | 225 | 13.4 | 62.1 | 225.0 |
| P6 | DMPA | MDI | b-7 | 100 | 330 | 225 | 13.4 | 82.6 | 36.0 |
| P7 | DMPA | HMDI | b-7 | 100 | 330 | 225 | 13.4 | 86.6 | 36.0 |
| P8 | DMPA | MDI | b-8 | 100 | 330 | 225 | 13.4 | 82.6 | 84.2 |
| P9 | DMBA | HMDI | b-6 | 100 | 330 | 225 | 14.8 | 86.6 | 225.0 |
| P10 | DMPA | TMHDI | a-1 | 100 | 330 | 225 | 13.4 | 69.4 | 32.4 |
| P11 | DMPA | TMHDI | a-2 | 100 | 330 | 225 | 13.4 | 69.4 | 44.2 |
| P12 | DMPA | TMHDI | a-3 | 100 | 330 | 225 | 13.4 | 69.4 | 54.1 |
| P13 | DMPA | TMHDI | a-4 | 100 | 330 | 225 | 13.4 | 69.4 | 38.3 |
| P14 | DMPA | TMHDI | a-7 | 100 | 330 | 225 | 13.4 | 69.4 | 44.6 |
| P15 | DMPA | TMHDI | a-9 | 100 | 330 | 225 | 13.4 | 69.4 | 142.2 |
| P16 | DMPA | TMHDI | a-10 | 100 | 330 | 225 | 13.4 | 69.4 | 76.1 |
| P17 | DMPA | TMHDI | a-12 | 100 | 330 | 225 | 13.4 | 69.4 | 109.0 |
| P18 | DMPA | TMHDI | a-13 | 100 | 330 | 225 | 13.4 | 69.4 | 115.3 |
| P19 | DMBA | TMHDI | a-7 | 100 | 330 | 225 | 14.8 | 69.4 | 44.6 |
| P20 | DMPA | TMHDI | a-2/a-12 | 100 | 330 | 100/125 | 13.4 | 69.4 | 19.6/60.6 |
| P21 | DMPA | IPDI | a-1 | 100 | 330 | 225 | 13.4 | 73.4 | 32.4 |
| P22 | DMPA | IPDI | a-2 | 100 | 330 | 225 | 13.4 | 73.4 | 44.2 |
| P23 | DMPA | IPDI | a-7 | 100 | 330 | 225 | 13.4 | 73.4 | 44.6 |
| P24 | DMPA | IPDI | a-12 | 100 | 330 | 225 | 13.4 | 73.4 | 109.0 |
| P25 | DMPA | HMDI | a-1 | 100 | 330 | 225 | 13.4 | 86.6 | 32.4 |

TABLE 10-continued

| Polymer | Type of Compound for Forming Polymer | | | Amount of Compound for Forming Polymer Used (mmol) | | | Amount of Compound for Forming Polymer Used (g) | | |
|---|---|---|---|---|---|---|---|---|---|
| Type | N1 | N2 | N3 | N1 | N2 | N3 | N1 | N2 | N3 |
| P26 | DMPA | HMDI | a-2 | 100 | 330 | 225 | 13.4 | 86.6 | 44.2 |
| P27 | DMPA | HMDI | a-7 | 100 | 330 | 225 | 13.4 | 86.6 | 44.6 |
| P28 | DMPA | HMDI | a-12 | 100 | 330 | 225 | 13.4 | 86.6 | 109.0 |
| P29 | DMPA | XDI | a-1 | 100 | 330 | 225 | 13.4 | 62.1 | 32.4 |
| P30 | DMPA | XDI | a-2 | 100 | 330 | 225 | 13.4 | 62.1 | 44.2 |
| P31 | DMPA | XDI | a-7 | 100 | 330 | 225 | 13.4 | 62.1 | 44.6 |
| P32 | DMPA | XDI | a-12 | 100 | 330 | 225 | 13.4 | 62.1 | 109.0 |
| P33 | DMPA | MDI | a-1 | 100 | 330 | 225 | 13.4 | 82.6 | 32.4 |
| P34 | DMPA | MDI | a-2 | 100 | 330 | 225 | 13.4 | 82.6 | 44.2 |
| P35 | DMPA | MDI | a-7 | 100 | 330 | 225 | 13.4 | 82.6 | 44.6 |
| P36 | DMPA | MDI | a-12 | 100 | 330 | 225 | 13.4 | 82.6 | 109.0 |
| P37 | DMPA | HMDI | a-2/a-12 | 100 | 330 | 100/125 | 13.4 | 86.6 | 19.6/60.6 |
| P38 | DMPA | TMHDI | b-6/a-2 | 100 | 383 | 130/148 | 13.4 | 80.5 | 130.0/29.0 |
| P39 | DMPA | TMHDI | b-6/a-2 | 100 | 276 | 130/41 | 13.4 | 58.0 | 130.0/8.0 |
| P40 | DMPA | HMDI | b-6 | 74.6 | 330 | 250 | 10.0 | 86.6 | 250 |
| P41 | DMPA | HMDI | b-6 | 522 | 610 | 85 | 70.0 | 160.0 | 85.0 |
| P42 | DMPA | HMDI | b-6 | 100 | 330 | 225 | 13.4 | 86.6 | 225.0 |
| P43 | DMPA | HMDI | b-6 | 100 | 330 | 225 | 13.4 | 86.6 | 225.0 |
| R1 | DMPA | TMHDI | b-6 | 100 | 330 | 225 | 13.4 | 69.4 | 225.0 |
| R2 | DMPA | IPDI | PEG | 100 | 330 | 225 | 13.4 | 73.4 | 225.0 |
| R3 | DMPA | IPDI | TMP | 100 | 330 | 150 | 13.4 | 73.4 | 20.1 |

TABLE 11

| Polymer Type | Total Content of Structural Units (1) and (2) (mass %) | Ring Value (mmol/g) | Acid Value (mmol/g) | Mw | Amount of Polymer Dissolved in 100 g of Distilled Water at 25° C. (g) |
|---|---|---|---|---|---|
| P1 | 24 | 1.1 | 0.3 | 10000 | ≤1 |
| P2 | 21 | 1.1 | 0.3 | 10000 | ≤1 |
| P3 | 27 | 2.0 | 0.3 | 10000 | ≤1 |
| P4 | 26 | 2.1 | 0.3 | 10000 | ≤1 |
| P5 | 21 | 1.1 | 0.3 | 10000 | ≤1 |
| P6 | 63 | 5.0 | 0.8 | 10000 | ≤1 |
| P7 | 64 | 4.9 | 0.7 | 10000 | ≤1 |
| P8 | 46 | 3.7 | 0.6 | 10000 | ≤1 |
| P9 | 27 | 2.0 | 0.3 | 10000 | ≤1 |
| P10 | 28 | 2.0 | 0.9 | 10000 | ≤1 |
| P11 | 35 | 5.3 | 0.8 | 10000 | ≤1 |
| P12 | 40 | 3.3 | 0.7 | 10000 | ≤1 |
| P13 | 32 | 1.9 | 0.8 | 10000 | ≤1 |
| P14 | 35 | 1.8 | 0.8 | 10000 | ≤1 |
| P15 | 63 | 2.0 | 0.4 | 10000 | ≤1 |
| P16 | 48 | 2.8 | 0.6 | 10000 | ≤1 |
| P17 | 57 | 2.3 | 0.5 | 10000 | ≤1 |
| P18 | 58 | 2.3 | 0.5 | 10000 | ≤1 |
| P19 | 35 | 1.7 | 0.8 | 10000 | ≤1 |
| P20 | 57 | 3.4 | 0.6 | 10000 | ≤1 |
| P21 | 89 | 4.7 | 0.8 | 10000 | ≤1 |
| P22 | 90 | 7.7 | 0.8 | 10000 | ≤1 |
| P23 | 90 | 4.2 | 0.8 | 10000 | ≤1 |
| P24 | 93 | 4.0 | 0.5 | 10000 | ≤1 |
| P25 | 90 | 6.7 | 0.8 | 10000 | ≤1 |
| P26 | 91 | 9.3 | 0.7 | 10000 | ≤1 |
| P27 | 91 | 6.1 | 0.7 | 10000 | ≤1 |
| P28 | 94 | 5.3 | 0.5 | 10000 | ≤1 |
| P29 | 88 | 5.1 | 0.9 | 10000 | ≤1 |
| P30 | 89 | 8.4 | 0.8 | 10000 | ≤1 |
| P31 | 89 | 4.6 | 0.8 | 10000 | ≤1 |
| P32 | 93 | 4.2 | 0.5 | 10000 | ≤1 |
| P33 | 90 | 6.9 | 0.8 | 10000 | ≤1 |
| P34 | 90 | 9.5 | 0.7 | 10000 | ≤1 |
| P35 | 90 | 6.3 | 0.7 | 10000 | ≤1 |
| P36 | 93 | 5.4 | 0.5 | 10000 | ≤1 |
| P37 | 93 | 6.7 | 0.6 | 10000 | ≤1 |
| P38 | 11 | 1.8 | 0.4 | 10000 | ≤1 |
| P39 | 4 | 0.6 | 0.5 | 10000 | ≤1 |
| P40 | 25 | 1.9 | 0.2 | 10000 | ≤1 |
| P41 | 51 | 3.9 | 1.7 | 10000 | ≤1 |
| P42 | 27 | 2.0 | 0.3 | 4000 | ≤1 |
| P43 | 27 | 2.0 | 0.3 | 120000 | ≤1 |
| R1 | 0 | 0.0 | 0.3 | 10000 | ≤1 |
| R2 | 24 | 1.1 | 0.3 | 10000 | ≥10 |
| R3 | 69 | 3.1 | 0.9 | 10000 | ≤1 |

[Preparation of Aqueous Dispersion of Colored Resin Particles]

Example 1

(Preparation of Dispersion 1)
—Preparation of Oil Phase Component—
Ethyl acetate, the 30 mass % solution of the polymer P1, and C. I. Solvent Black 3 (SB-3, trade name: Oil Black 860, manufactured by Orient Chemical Industries Co., Ltd.) were mixed and stirred for 15 minutes to obtain 149.8 g of an oil phase component having a solid content of 30 mass %.

In the preparation of the oil phase component, the amounts of the 30 mass % solution of the polymer P1 and SB-3 used were set such that the contents (mass %) of the polymer P1 and SB-3 with respect to the solid content of colored resin particles to be manufactured were as shown in Table 12.

—Preparation of Water Phase Component—
A water phase component was prepared by mixing 135.3 g of distilled water and sodium hydroxide as a neutralizing agent and stirring the mixture for 15 minutes.

The amount of the sodium hydroxide as a neutralizing agent used was adjusted such that the degree of neutralization was 90% in the colored resin particles to be manufactured.

The specific amount of the sodium hydroxide was calculated by the following expression.

Amount (g) of Sodium Hydroxide=Total Amount (g) of Oil Phase Component×(Solid Content Concentration (mass %) of Oil Phase Component/100)×(Content (mass %) of Chain Polymer P1 with respect to Solid Content of Oil Phase Component/100)×Acid Value (mmol/g) of Water-Insoluble chain Polymer P1×0.9×Molecular Weight (g/mol) of Sodium Hydroxide/1,000

—Preparation of Dispersion 1—

The oil phase component and the water phase component were mixed, and the obtained mixture was emulsified at 18,000 rpm for 10 minutes using a homogenizer at room temperature to obtain an emulsion. The obtained emulsion was added to 48.0 g of distilled water, and the obtained liquid was heated to 50° C. and stirred at 50° C. for 5 hours to distill off the ethyl acetate and isopropyl alcohol from the liquid.

The liquid in which the ethyl acetate and isopropyl alcohol were distilled off was diluted with distilled water such that the solid content was 20 mass %, and thus a dispersion 1 of colored resin particles.

Examples 2 to 37, Examples 53 to 58, and Comparative Examples R1 to R3

(Preparation of Dispersions 2 to 37, 53 to 58, and R1 to R3)

Dispersions 2 to 37, 53 to 58, and R1 to R3 were prepared in the same manner as in Example 1, except that the polymer P1 used in the preparation of the aqueous dispersion was changed to the polymers shown in Tables 12 and 13, respectively.

Examples 38 to 46 and 59

(Preparation of Dispersions 38 to 46)

Dispersions 38 to 46 and 59 were obtained in the same manner as in Example 1, except that in the preparation of the oil phase component, the polymer P1 was changed to the polymers shown in Table 13, respectively, and the amounts of the 30 mass % solution of the polymer and the dye were changed such that the contents (mass %) of the polymer and the dye with respect to the solid content of the colored resin particles to be manufactured were as shown in Table 13.

Examples 47 to 49

(Preparation of Dispersions 47 to 49)

Dispersions 47 to 49 were obtained in the same manner as in Example 1, except that in the preparation of the oil phase component, the polymer P1 was changed to the polymer P37, the amounts of the 30 mass % solution of the polymer and the dye were changed such that the contents (mass %) of the polymer and the dye with respect to the solid content of the colored resin particles to be manufactured were as shown in Table 13, oil-1 to oil-3 were added as an oily organic solvent such that the contents thereof were as shown in Table 13, and the materials were mixed and stirred for 15 minutes.

The oil-1 to oil-3 are as follows.

Oil-1: DBE (manufactured by INVISTA, dibasic acid ester)

Oil-2: Dimethyl Succinate (manufactured by TOKYO CHEMICAL INDUSTRY)

Oil-3: Diethylene Glycol Monobutyl Ether Acetate (manufactured by TOKYO CHEMICAL INDUSTRY)

The boiling points thereof will be shown below.

Oil-1: 196° C. to 225° C.
Oil-2: 196° C.
Oil-3: 247° C.

Examples 50 to 52

(Preparation of Dispersions 50 to 52)

Dispersions 50 to 52 were obtained in the same manner as in Example 1, except that in the preparation of the oil phase component, the polymer P1 was changed to the polymer P37, the dye was respectively changed to SR-24, SB-44, and DR-60/VR-41 shown in Table 13, the amounts of the 30 mass % solution of the polymer and the dye were changed such that the contents (mass %) of the polymer and the dye with respect to the solid content of the colored resin particles to be manufactured were as shown in Table 13, oil-1 was added as an oily organic solvent such that the content thereof was as shown in Table 13, and the materials were mixed and stirred for 15 minutes.

Example 60

(Preparation of Dispersion 60)

A dispersion 60 was obtained in the same manner as in Example 1, except that the polymer P1 used for preparation of the aqueous dispersion was changed to the polymer P17 shown in Table 13, and 3.3 g of PERBUTYL Z (manufactured by NOF CORPORATION) was further added as an oil phase component.

The dyes used are as follows.
SR-24: C. I. Solvent Red 24
SB-44: C. I. Solvent Blue 44
DR-60: C. I. Disperse Red 60
VR-41: C. I. Vat Red 41

Examples 61 to 68

(Preparation of Dispersions 61 to 68)

Dispersions 61 to 68 were obtained in the same manner as in Example 1, except that the polymer P1 used for preparation of the aqueous dispersion was changed to the polymer P37 shown in Table 14, and the dye was changed to SB-27, SB-28, SB-29, SBlue-70, and (1-3) shown in Table 14, respectively.

The dyes used are as follows.
SB-27: C. I. Solvent Black 27 (chromium complex)
SB-28: C. I. Solvent Black 28 (chromium complex)
SB-29: C. I. Solvent Black 29 (chromium complex)
SBlue-70: C. I. Solvent Blue 70 (copper complex)
(1-3): A compound shown below

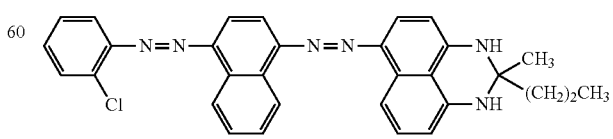

(1-3)

The compound (1-3) was synthesized according to the following scheme.

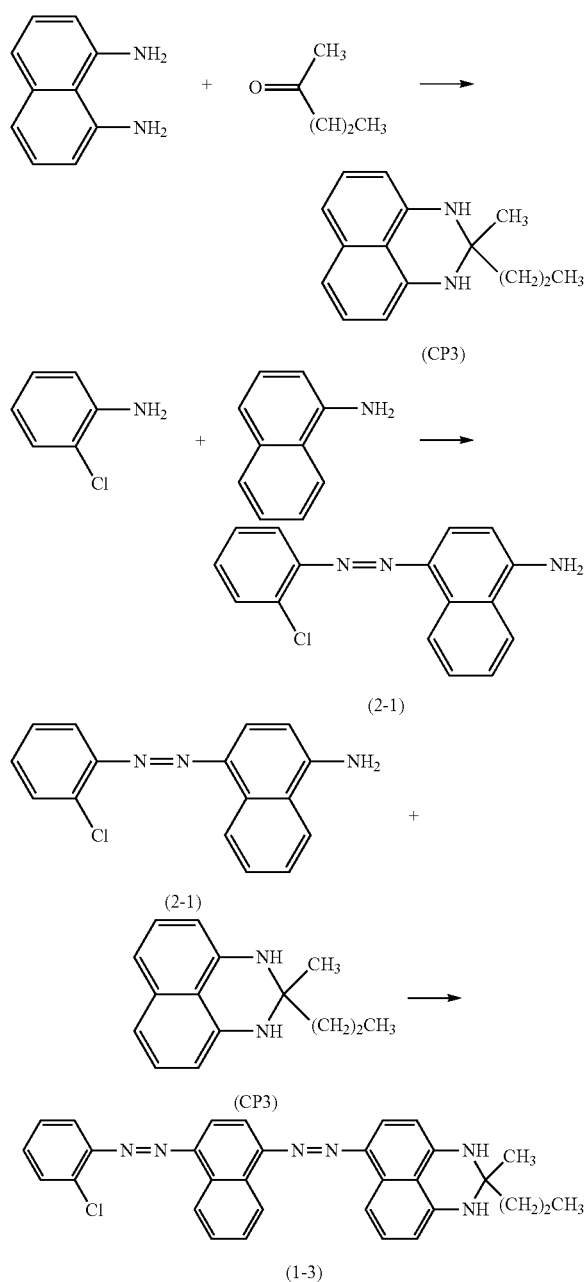

(CP3)

(2-1)

(2-1)

(CP3)

(1-3)

[Synthesis of Intermediate (CP3)]

158 g (1 mol) of 1,8-naphthalenediamine (manufactured by FUJIFILM Wako Pure Chemical Corporation) and 1,400 mL of methanol were added to a 3 L three-neck flask, and then 57 g (0.6 mol) of a concentrated sulfuric acid (manufactured by FUJIFILM Wako Pure Chemical Corporation, special grade reagent) was slowly added dropwise under ice cooling while an internal temperature of 40° C. or lower was maintained. 100 g (1.16 mol) of 2-pentanone (manufactured by FUJIFILM Wako Pure Chemical Corporation, first grade reagent) corresponding to a ketone compound (X) was injected into the suspension, and then reacted at an internal temperature of 55° C. for 1 hour. The reaction liquid was cooled to room temperature (25° C.), and 1,500 mL of a 2 mol/L sodium hydroxide aqueous solution was slowly added dropwise thereto under water cooling. After stirring at room temperature for 15 minutes, suction filtration was performed, and washing was performed with 1,000 mL of water/methanol=1/1 (v/v), 1,000 mL of water, and finally 1,000 mL of water/methanol=1/1 (v/v). The obtained powder was dried for 24 hours by a blast dryer at 50° C. to obtain a light brown powder of an intermediate (CP3) (210 g, 93% yield).

[Synthesis of Compound (2-1)]

71.4 g (0.56 mol) of o-chloroaniline (manufactured by FUJIFILM Wako Pure Chemical Corporation, special grade reagent) corresponding to o-substituted aniline (Y) and 560 mL of water were added to a 1 L three-neck flask, and then 140 mL (1.68 mol) of a concentrated hydrochloric acid (manufactured by FUJIFILM Wako Pure Chemical Corporation, special grade reagent) was slowly added dropwise under ice cooling while an internal temperature of 10° C. or lower was maintained. To the above solution, an aqueous solution obtained by dissolving of 38.64 g of sodium nitrite (manufactured by FUJIFILM Wako Pure Chemical Corporation, special grade reagent) in 69.6 g of water was slowly added dropwise while an internal temperature of 0° C. to 5° C. was maintained. Then, the solution was reacted at an internal temperature of 0° C. to 5° C. for 15 minutes. 5.44 g of an amidosulfuric acid (manufactured by FUJIFILM Wako Pure Chemical Corporation, first grade reagent) was added thereto, and reacted at an internal temperature of 0° C. to 5° C. for 15 minutes to prepare a diazonium salt solution.

Separately, 76.2 g (0.53 mol) of 1-naphthylamine (manufactured by MAHATME DYE CHEM PVT LTD.) and 1,904 mL of acetone were added to a 3 L three-neck flask, and then the mixture was cooled to an internal temperature of 15° C. The diazonium salt solution previously prepared was carefully added dropwise to the above solution while an internal temperature of 15° C. to 20° C. was maintained. Then, the solution was reacted at an internal temperature of 15° C. to 20° C. for 30 minutes. The crystals precipitating from the reaction liquid were collected by suction filtration, and washed with 1,000 mL of acetone/water=1/1 (v/v). The wet cake of the crystals was added to 1,500 mL of acetone/ethyl acetate=1/1 (v/v), heated to 45° C. to 50° C., stirred for 15 minutes, and then filtered through hot filtration. After washing with 500 mL of acetone/ethyl acetate=1/1 (v/v), the resulting material was dried for 6 hours by a blast dryer at 40° C. to obtain a hydrochloride of a compound (2-1) as dark green crystals (142 g, 85% yield).

[Synthesis of Compound (1-3)]

29.8 g (0.094 mol) of the hydrochloride of the compound (2-1), 172 mL of water, 120 mL of an acetic acid (manufactured by FUJIFILM Wako Pure Chemical Corporation, special grade reagent), and 172 mL of a propionic acid (manufactured by FUJIFILM Wako Pure Chemical Corporation, special grade reagent) were added to a 1 L three-neck flask, and cooled to an internal temperature of 5° C. 22.4 mL (0.269 mol) of a concentrated hydrochloric acid (manufactured by FUJIFILM Wako Pure Chemical Corporation, special grade reagent) was carefully added dropwise thereto at an internal temperature of 10° C. or lower, and then an aqueous solution obtained by dissolving 6.48 g (0.094 mol) of sodium nitrite (manufactured by FUJIFILM Wako Pure Chemical Corporation, special grade reagent) in 25.6 mL of water was slowly added dropwise while an internal temperature of 0° C. to 5° C. was maintained. Then, the mixture was reacted at an internal temperature of 0° C. to 5° C. for 1 hour [diazonium salt solution].

Separately, 21.28 g (0.094 mol) of the intermediate (CP3), an amidosulfuric acid (manufactured by FUJIFILM Wako Pure Chemical Corporation, first grade reagent), 128 mL of tetrahydrofuran (manufactured by FUJIFILM Wako Pure Chemical Corporation, special grade reagent), and 128 mL of water were added to a 2 L three-neck flask, and cooled to an internal temperature of 5° C. The diazonium salt solution previously prepared was slowly added dropwise while an internal temperature of 5° C. to 10° C. was maintained. Then, the mixture was reacted at an internal temperature of 0° C. to 10° C. for 30 minutes, and then reacted at an internal temperature of 15° C. to 20° C. for 30 minutes. 576 mL of acetone was added dropwise thereto, and the precipitating crystals were collected by suction filtration and washed with acetone/water=1/1 (v/v). The obtained wet cake was added to 3,000 mL of ethyl acetate/1,200 mL of water and stirred, and the mixture was neutralized to pH 8 with a sodium hydrogen carbonate aqueous solution. Then, the insoluble matter was removed by Celite filtration, and the residue obtained by concentrating only the ethyl acetate layer using a rotary evaporator was recrystallized with methanol. Therefore, dark green glossy crystals of a compound (1-3) were obtained (30.6 g, 64% yield).

The following Tables 12 to 14 show the types and the contents of the components of the colored resin particle dispersions. In Tables 12 to 14, the content of the polymer and the dye is a value representing the content of the polymer and the dye based on the solid content of the colored resin particles by mass %, and the content of the oily organic solvent is a value representing the amount of the oily organic solvent added based on the solid content of the colored resin particles by mass %.

In all of the examples and comparative examples, the average particle diameter of the colored resin particles was 150 nm.

TABLE 12

| Colored Resin Particle Dispersion | Polymer Type | Polymer Content (mass %) | Dye Type | Dye Content (mass %) | Mass Ratio of Polymer to Dye | Oily Organic Solvent Type | Oily Organic Solvent Content (mass %) |
|---|---|---|---|---|---|---|---|
| Dispersion 1 | P1 | 60 | SB-3 | 40 | 1.5 | — | 0 |
| Dispersion 2 | P2 | 60 | SB-3 | 40 | 1.5 | — | 0 |
| Dispersion 3 | P3 | 60 | SB-3 | 40 | 1.5 | — | 0 |
| Dispersion 4 | P4 | 60 | SB-3 | 40 | 1.5 | — | 0 |
| Dispersion 5 | P5 | 60 | SB-3 | 40 | 1.5 | — | 0 |
| Dispersion 6 | P6 | 60 | SB-3 | 40 | 1.5 | — | 0 |
| Dispersion 7 | P7 | 60 | SB-3 | 40 | 1.5 | — | 0 |
| Dispersion 8 | P8 | 60 | SB-3 | 40 | 1.5 | — | 0 |
| Dispersion 9 | P9 | 60 | SB-3 | 40 | 1.5 | — | 0 |
| Dispersion 10 | P10 | 60 | SB-3 | 40 | 1.5 | — | 0 |
| Dispersion 11 | P11 | 60 | SB-3 | 40 | 1.5 | — | 0 |
| Dispersion 12 | P12 | 60 | SB-3 | 40 | 1.5 | — | 0 |
| Dispersion 13 | P13 | 60 | SB-3 | 40 | 1.5 | — | 0 |
| Dispersion 14 | P14 | 60 | SB-3 | 40 | 1.5 | — | 0 |
| Dispersion 15 | P15 | 60 | SB-3 | 40 | 1.5 | — | 0 |
| Dispersion 16 | P16 | 60 | SB-3 | 40 | 1.5 | — | 0 |
| Dispersion 17 | P17 | 60 | SB-3 | 40 | 1.5 | — | 0 |
| Dispersion 18 | P18 | 60 | SB-3 | 40 | 1.5 | — | 0 |
| Dispersion 19 | P19 | 60 | SB-3 | 40 | 1.5 | — | 0 |
| Dispersion 20 | P20 | 60 | SB-3 | 40 | 1.5 | — | 0 |
| Dispersion 21 | P21 | 60 | SB-3 | 40 | 1.5 | — | 0 |
| Dispersion 22 | P22 | 60 | SB-3 | 40 | 1.5 | — | 0 |
| Dispersion 23 | P23 | 60 | SB-3 | 40 | 1.5 | — | 0 |
| Dispersion 24 | P24 | 60 | SB-3 | 40 | 1.5 | — | 0 |
| Dispersion 25 | P25 | 60 | SB-3 | 40 | 1.5 | — | 0 |
| Dispersion 26 | P26 | 60 | SB-3 | 40 | 1.5 | — | 0 |
| Dispersion 27 | P27 | 60 | SB-3 | 40 | 1.5 | — | 0 |
| Dispersion 28 | P28 | 60 | SB-3 | 40 | 1.5 | — | 0 |
| Dispersion 29 | P29 | 60 | SB-3 | 40 | 1.5 | — | 0 |
| Dispersion 30 | P30 | 60 | SB-3 | 40 | 1.5 | — | 0 |
| Dispersion 31 | P31 | 60 | SB-3 | 40 | 1.5 | — | 0 |
| Dispersion 32 | P32 | 60 | SB-3 | 40 | 1.5 | — | 0 |

TABLE 13

| Colored Resin Particle Dispersion | Polymer Type | Polymer Content (mass %) | Dye Type | Dye Content (mass %) | Mass Ratio of Polymer to Dye | Oily Organic Solvent Type | Oily Organic Solvent Content (mass %) |
|---|---|---|---|---|---|---|---|
| Dispersion 33 | P33 | 60 | SB-3 | 40 | 1.5 | — | 0 |
| Dispersion 34 | P34 | 60 | SB-3 | 40 | 1.5 | — | 0 |
| Dispersion 35 | P35 | 60 | SB-3 | 40 | 1.5 | — | 0 |
| Dispersion 36 | P36 | 60 | SB-3 | 40 | 1.5 | — | 0 |
| Dispersion 37 | P37 | 60 | SB-3 | 40 | 1.5 | — | 0 |
| Dispersion 38 | P1 | 40 | SB-3 | 60 | 0.7 | — | 0 |
| Dispersion 39 | P22 | 40 | SB-3 | 60 | 0.7 | — | 0 |
| Dispersion 40 | P24 | 40 | SB-3 | 60 | 0.7 | — | 0 |
| Dispersion 41 | P26 | 40 | SB-3 | 60 | 0.7 | — | 0 |
| Dispersion 42 | P28 | 40 | SB-3 | 60 | 0.7 | — | 0 |
| Dispersion 43 | P30 | 40 | SB-3 | 60 | 0.7 | — | 0 |
| Dispersion 44 | P32 | 40 | SB-3 | 60 | 0.7 | — | 0 |
| Dispersion 45 | P37 | 40 | SB-3 | 60 | 0.7 | — | 0 |
| Dispersion 46 | P22 | 30 | SB-3 | 70 | 0.4 | — | 0 |
| Dispersion 47 | P37 | 25 | SB-3 | 70 | 0.4 | oil-1 | 5 |
| Dispersion 48 | P37 | 25 | SB-3 | 70 | 0.4 | oil-2 | 5 |
| Dispersion 49 | P37 | 25 | SB-3 | 70 | 0.4 | oil-3 | 5 |
| Dispersion 50 | P37 | 60 | SR-24 | 30 | 2.0 | oil-1 | 10 |
| Dispersion 51 | P37 | 60 | SB-44 | 30 | 2.0 | oil-1 | 10 |
| Dispersion 52 | P37 | 60 | DR-60/VR-41 | 25/5 | 2.0 | oil-1 | 10 |
| Dispersion 53 | P38 | 60 | SB-3 | 40 | 1.5 | — | 0 |
| Dispersion 54 | P39 | 60 | SB-3 | 40 | 1.5 | — | 0 |
| Dispersion 55 | P40 | 60 | SB-3 | 40 | 1.5 | — | 0 |

TABLE 13-continued

| Colored Resin Particle Dispersion | Polymer Type | Polymer Content (mass %) | Dye Type | Dye Content (mass %) | Mass Ratio of Polymer to Dye | Oily Organic Solvent Type | Oily Organic Solvent Content (mass %) |
|---|---|---|---|---|---|---|---|
| Dispersion 56 | P41 | 60 | SB-3 | 40 | 1.5 | — | 0 |
| Dispersion 57 | P42 | 60 | SB-3 | 40 | 1.5 | — | 0 |
| Dispersion 58 | P43 | 60 | SB-3 | 40 | 1.5 | — | 0 |
| Dispersion 59 | P3 | 75 | SB-3 | 25 | 3.0 | — | 0 |
| Dispersion 60 | P17 | 59 | SB-3 | 40 | 1.5 | — | 0 |
| Dispersion R1 | R1 | 60 | SB-3 | 40 | 1.5 | — | 0 |
| Dispersion R2 | R2 | 60 | SB-3 | 40 | 1.5 | — | 0 |
| Dispersion R3 | R3 | 60 | SB-3 | 40 | 1.5 | — | 0 |

TABLE 14

| Colored Resin Particle Dispersion | Polymer Type | Polymer Content (mass %) | Dye Type | Dye Content (mass %) | Mass Ratio of Water-Insoluble chain Polymer to Dye | Oily Organic Solvent Type | Oily Organic Solvent Content (mass %) |
|---|---|---|---|---|---|---|---|
| Dispersion 61 | P37 | 60 | SB-27 | 40 | 1.5 | — | 0 |
| Dispersion 62 | P37 | 60 | SB-28 | 40 | 1.5 | — | 0 |
| Dispersion 63 | P37 | 60 | SB-29 | 40 | 1.5 | — | 0 |
| Dispersion 64 | P37 | 60 | SBlue-70 | 40 | 1.5 | — | 0 |
| Dispersion 65 | P37 | 60 | (1-3) | 40 | 1.5 | — | 0 |
| Dispersion 66 | P3 | 60 | SB-27 | 40 | 1.5 | — | 0 |
| Dispersion 67 | P3 | 60 | SB-28 | 40 | 1.5 | — | 0 |
| Dispersion 68 | P3 | 60 | SB-29 | 40 | 1.5 | — | 0 |

(Preparation of Ink)

Example 1a (Preparation of Ink 1a)
An ink 1a was produced by mixing components of the following composition.
—Composition of Ink—

| | |
|---|---|
| Dispersion 1 | 82 parts by mass |
| Pigment Dispersion Liquid | 13 parts by mass |
| Fluorine-Based surfactant | 0.3 parts by mass |
| 2-Methylpropanediol | 4.7 parts by mass |

The pigment dispersion liquid and the fluorine-based surfactant used for preparation of the ink are as follows.

Pigment Dispersion Liquid: Pro-jet Black APD1000 (manufactured by Fujifilm Imaging Colorants), pigment concentration 14 mass %

Fluorine-Based Surfactant: manufactured by DuPont, Capstone FS-31, solid content 25 mass %

Examples 2a to 57a, 61a to 68a, and Comparative Examples 1a to 3a (Preparation of Inks 2a to 57a, 61a to 68a, and R1a to R3a)
Inks 2a to 57a, 61a to 68a, and R1a to R3a were obtained in the same manner as in the case of the ink 1a, except that the dispersion 1 was changed to the dispersions shown in the following Tables 15 to 17, respectively.
[Evaluation]
The inks 2a to 57a, 61a to 68a, and R1a to R3a obtained as above were filtered through a polytetrafluoroethylene (PTFE) membrane filter (pore diameter: 1 μm), and then evaluation was performed as follows. The results thereof are shown in Tables 15 to 17.

<Pencil Hardness of Image (Cured Film)>
By applying the ink stored at room temperature within 1 day after the preparation to a base material, a coating film having a thickness of 2 μm was formed on the base material. A polystyrene (PS) sheet ("falcon hi impact polystyrene" manufactured by Robert Home) was used as the base material. In addition, the application was performed using a No. 2 bar of K HAND COATER manufactured by RK PRINTCOAT INSTRUMENTS. Next, the coating film was dried at 60° C. for 3 minutes. The dried coating film was heated in an oven at 160° C. for 3 minutes to cure the dried coating film. The pencil hardness of the cured film was measured based on JIS K5600-5-4 (1999). As the pencil used for measurement of the pencil hardness, UNI (registered trademark) manufactured by MITSUBISHIPENCIL CO., LTD. was used. The allowable range of the pencil hardness is HB or higher, and is preferably H or higher. A cured film having pencil hardness of B or lower is not preferable since scratches may occur during handling.

<Adhesiveness of Image (Cured Film)>
A cured film was formed in the same manner as in the formation of the cured film in the evaluation of pencil hardness. A cross hatch test was performed on the obtained cured film in conformity with ISO2409 (2013) (cross cut method), and the adhesiveness of the cured film to a polystyrene (PS) base material was evaluated according to the following evaluation criteria. In the cross hatch test, 25 square lattices of 1 mm square were formed with a cut interval of 1 mm. In the following evaluation criteria, 0 and 1 are practically acceptable levels. In the following evaluation criteria, a peeling rate (%) of lattices is a value obtained by the following expression. The total number of lattices in the following expression is 25.

Peeling Rate of Lattices (%)=[(Number of Lattices Peeled Off)/(Total Number of Lattices)]×100

—Criteria for Evaluation of Image (cured film) Adhesiveness—

0: The peeling rate (%) of lattices was 0%.
1: The peeling rate (%) of lattices was greater than 0% and 5% or less.
2: The peeling rate (%) of lattices was greater than 5% and 15% or less.
3: The peeling rate (%) of lattices was greater than 15% and 35% or less.
4: The peeling rate (%) of lattices was greater than 35% and 65% or less.
5: The peeling rate (%) of lattices was greater than 65%.

The PS base material used for evaluation of the adhesiveness of the cured film is a hydrophobic base material having no polar group on the surface, and is thus different from a polyethylene terephthalate (PET) base material and a polyvinyl chloride (PVC) base material having a polar group on the surface. Accordingly, in the formation of an image using an aqueous ink, the PS base material is a base material in which the adhesiveness between an image (cured film) and a base material is hardly obtained compared with a PET base material and a PVC base material. Accordingly, the evaluation of the adhesiveness of the cured film using the PS base material is adhesiveness evaluation under strict conditions. Therefore, the excellent evaluation results of the adhesiveness of the cured film mean that the adhesiveness of the cured film to the base material is extremely excellent.

<Color Developability>

A cured film was formed in the same manner as in the formation of the cured film in the evaluation of pencil hardness. Evaluation was performed on the obtained cured film using a colorimeter (Gretag Macbeth Spectrolino, manufactured by X-Rite, Inc.). Color developability of black was evaluated as follows. In the following evaluation criteria, SSS to A are practically acceptable levels.

Black:
SSS: The optical density (OD) value is 1.7 or greater.
SS: The OD value is 1.6 or greater and less than 1.7.
S: The OD value is 1.4 or greater and less than 1.6.
A: The OD value is 1.2 or greater and less than 1.4.
B: The OD value is 1.0 or greater and less than 1.2.
C: The OD value is 0.8 or greater and less than 1.0.
D: The OD value is less than 0.8.

<Jetting Property of Ink>

The ink stored at room temperature within 1 day after the preparation was ejected for 30 minutes from a head of an inkjet printer (manufactured by FUJIFILM Dimatix, Inc., DMP), and then the ejection was stopped. After 5 minutes from the stop of the ejection, the ink was ejected again from the head to the above-described PS base material to form solid images of 5 cm×5 cm. These images were visually observed to confirm whether dots were missed due to the occurrence of a non-ejection nozzle or the like, and the jetting property of the ink was evaluated according to the following evaluation criteria. In the following evaluation criteria, one of which the jetting property of the ink was most excellent is A.

—Criteria for Evaluation of Jetting Property—

A: Dot omission due to the occurrence of a non-ejection nozzle or the like was not confirmed, and a satisfactory image was obtained.
B: Dot omission due to the occurrence of a non-ejection nozzle or the like was slightly confirmed, but the dot omission did not cause any problems in practical use.
C: Dot omission due to the occurrence of a non-ejection nozzle or the like was generated, and the image was not able to be used in practice.
D: The ink was not able to be ejected from the head.

<Ink Storage Stability 1>

The ink stored at room temperature within 1 day after the preparation was sealed in a container and left at 60° C. for two weeks. The ink after two weeks had elapsed was subjected to the same evaluation as that performed on the jetting property to evaluate the storage stability of the ink according to the same evaluation criteria. In the evaluation criteria, one of which the storage stability of the ink was most excellent is A.

TABLE 15

| | | Colored Resin Particle Dispersion | Evaluation Results | | | | |
|---|---|---|---|---|---|---|---|
| | Ink | | Color Developability | Pencil Hardness | Adhesiveness | Jetting Property | Storage Stability 1 |
| Example 1a | 1a | Dispersion 1 | S | HB | 1 | A | B |
| Example 2a | 2a | Dispersion 2 | S | HB | 1 | A | B |
| Example 3a | 3a | Dispersion 3 | S | HB | 1 | A | B |
| Example 4a | 4a | Dispersion 4 | S | HB | 1 | A | B |
| Example 5a | 5a | Dispersion 5 | S | HB | 1 | A | B |
| Example 6a | 6a | Dispersion 6 | S | H | 0 | A | A |
| Example 7a | 7a | Dispersion 7 | S | H | 0 | A | A |
| Example 8a | 8a | Dispersion 8 | S | HB | 1 | A | B |
| Example 9a | 9a | Dispersion 9 | S | HB | 1 | A | B |
| Example 10a | 10a | Dispersion 10 | S | HB | 1 | A | B |
| Example 11a | 11a | Dispersion 11 | S | H | 0 | A | A |
| Example 12a | 12a | Dispersion 12 | S | HB | 1 | A | B |
| Example 13a | 13a | Dispersion 13 | S | HB | 1 | A | B |
| Example 14a | 14a | Dispersion 14 | S | HB | 1 | A | B |
| Example 15a | 15a | Dispersion 15 | S | HB | 1 | A | B |
| Example 16a | 16a | Dispersion 16 | S | HB | 1 | A | B |
| Example 17a | 17a | Dispersion 17 | S | HB | 1 | A | B |
| Example 18a | 18a | Dispersion 18 | S | HB | 1 | A | B |
| Example 19a | 19a | Dispersion 19 | S | HB | 1 | A | B |
| Example 20a | 20a | Dispersion 20 | S | HB | 1 | A | B |
| Example 21a | 21a | Dispersion 21 | S | H | 0 | A | A |
| Example 22a | 22a | Dispersion 22 | S | H | 0 | A | A |
| Example 23a | 23a | Dispersion 23 | S | H | 0 | A | A |
| Example 24a | 24a | Dispersion 24 | S | H | 0 | A | A |
| Example 25a | 25a | Dispersion 25 | S | H | 0 | A | A |

TABLE 15-continued

| | Ink | Colored Resin Particle Dispersion | Color Developability | Pencil Hardness | Adhesiveness | Jetting Property | Storage Stability 1 |
|---|---|---|---|---|---|---|---|
| Example 26a | 26a | Dispersion 26 | S | H | 0 | A | A |
| Example 27a | 27a | Dispersion 27 | S | H | 0 | A | A |
| Example 28a | 28a | Dispersion 28 | S | H | 0 | A | A |
| Example 29a | 29a | Dispersion 29 | S | H | 0 | A | A |
| Example 30a | 30a | Dispersion 30 | S | H | 0 | A | A |

TABLE 16

| | Ink | Colored Resin Particle Dispersion | Color Developability | Pencil Hardness | Adhesiveness | Jetting Property | Storage Stability 1 |
|---|---|---|---|---|---|---|---|
| Example 31a | 31a | Dispersion 31 | S | H | 0 | A | A |
| Example 32a | 32a | Dispersion 32 | S | H | 0 | A | A |
| Example 33a | 33a | Dispersion 33 | S | H | 0 | A | A |
| Example 34a | 34a | Dispersion 34 | S | H | 0 | A | A |
| Example 35a | 35a | Dispersion 35 | S | H | 0 | A | A |
| Example 36a | 36a | Dispersion 36 | S | H | 0 | A | A |
| Example 37a | 37a | Dispersion 37 | S | H | 0 | A | A |
| Example 38a | 38a | Dispersion 38 | S | HB | 1 | A | B |
| Example 39a | 39a | Dispersion 39 | SS | H | 0 | A | A |
| Example 40a | 40a | Dispersion 40 | SS | H | 0 | A | A |
| Example 41a | 41a | Dispersion 41 | SS | H | 0 | A | A |
| Example 42a | 42a | Dispersion 42 | SS | H | 0 | A | A |
| Example 43a | 43a | Dispersion 43 | SS | H | 0 | A | A |
| Example 44a | 44a | Dispersion 44 | SS | H | 0 | A | A |
| Example 45a | 45a | Dispersion 45 | SS | H | 0 | A | A |
| Example 46a | 46a | Dispersion 46 | SS | H | 0 | A | A |
| Example 47a | 47a | Dispersion 47 | SSS | H | 0 | A | A |
| Example 48a | 48a | Dispersion 48 | SSS | H | 0 | A | A |
| Example 49a | 49a | Dispersion 49 | SSS | H | 0 | A | A |
| Example 50a | 50a | Dispersion 53 | S | HB | 1 | B | B |
| Example 51a | 51a | Dispersion 54 | S | HB | 1 | B | B |
| Example 52a | 52a | Dispersion 55 | S | HB | 1 | B | B |
| Example 53a | 53a | Dispersion 56 | S | HB | 1 | B | B |
| Example 54a | 54a | Dispersion 57 | S | HB | 1 | B | B |
| Example 55a | 55a | Dispersion 58 | S | HB | 1 | B | B |
| Example 56a | 56a | Dispersion 59 | A | HB | 1 | A | B |
| Example 57a | 57a | Dispersion 60 | S | H | 0 | A | B |
| Comparative Example 1a | R1a | Dispersion R1 | B | B | 2 | A | C |
| Comparative Example 2a | R2a | Dispersion R2 | D | B | 5 | D | D |
| Comparative Example 3a | R3a | Dispersion R3 | B | HB | 1 | A | B |

TABLE 17

| | Ink | Colored Resin Particle Dispersion | Color Developability | Pencil Hardness | Adhesiveness | Jetting Property | Storage Stability 1 |
|---|---|---|---|---|---|---|---|
| Example 61a | 61a | Dispersion 61 | SSS | H | 0 | A | A |
| Example 62a | 62a | Dispersion 62 | SSS | H | 0 | A | A |
| Example 63a | 63a | Dispersion 63 | SSS | H | 0 | A | A |
| Example 64a | 64a | Dispersion 64 | SSS | H | 0 | A | A |
| Example 65a | 65a | Dispersion 65 | SSS | H | 0 | A | A |
| Example 66a | 66a | Dispersion 66 | S | HB | 1 | A | A |
| Example 67a | 67a | Dispersion 67 | S | HB | 1 | A | A |
| Example 68a | 68a | Dispersion 68 | S | HB | 1 | A | A |

The inks according to the embodiment of the present invention had excellent jetting stability and excellent storage stability, and made it possible to obtain an image (cured film) having excellent color developability, pencil hardness, and adhesiveness to a base material.

In contrast, in Comparative Example 1a in which the polymer in the colored resin particles did not have a cyclic structure, it was difficult to hold the dye at a high concentration, and the color developability and the storage stability of the ink were poor. In addition, since the polymer did not have rigidity and hydrophobicity derived from the cyclic structure, the pencil hardness and the adhesiveness were also poor. In Comparative Example 3a in which the polymer had a crosslinking structure, the polymer had a poor affinity for the dye, and as a result, the dye holding property was poor, and the color developability was thus poor. In Comparative Example 2a in which the polymer was water-soluble, the dye holding property was at the lowest level, and the results were poor in all the evaluation items.

[Preparation of Printing Inkjet Ink]

Example 1b (Preparation of Printing Inkjet Ink 1b)

A printing inkjet ink 1b was produced by mixing components of the following composition.

—Composition of Printing Inkjet Ink—

| Dispersion 1 (solid content) | 10 parts by mass |
| Pigment (solid content) | 1 part by mass |
| Surfactant (solid content) | 1 part by mass |
| Tetraethylene glycol | 35 parts by mass |
| Water | 53 parts by mass |

The pigment and the surfactant used for preparation of the ink are as follows.

Pigment: CAB-O-JET 200 (manufactured by Cabot Corporation)

Surfactant: Surfynol 104 (manufactured by Nissin Chemical Co., Ltd.)

Examples 2b to 52b and Comparative Examples 1b to 3b (Preparation of Printing Inkjet Inks 2b to 52b)

Printing inkjet inks 2b to 52b were obtained in the same manner as in the case of the printing inkjet ink 1b, except that the dispersion 1 was changed to the dispersions 2 to 52, respectively.

Examples 53b and 54b (Preparation of Printing Inkjet Inks 53b and 54b)

Printing inkjet inks 53b and 54b were produced by mixing components of the following composition.

—Composition of Printing Inkjet Ink—

| Dispersion 3 (solid content) | 5 parts by mass |
| Pigment (solid content) (CAB-O-JET 200) | 1 part by mass |
| Surfactant (solid content) (Surfynol 104) | 1 part by mass |
| Tetraethylene Glycol | 35 parts by mass |
| Crosslinking Agent (solid content) | 5 parts by mass |
| Water | 53 parts by mass |

As the crosslinking agent, ELASTRON BN-77 (manufactured by DKS Co. Ltd.) was used in the printing inkjet ink 53b, and E-05 (manufactured by Nisshinbo Chemical Inc.) was used in the printing inkjet ink 54b.

CAB-O-JET 200 is self-dispersing carbon black manufactured by Cabot Corporation.

Examples 55b and 56b (Preparation of Printing Inkjet Inks 55b and 56b)

Printing inkjet inks 55b and 56b were produced by mixing components of the following composition.

—Composition of Printing Inkjet Ink—

| Dispersion 3 (solid content) | 5 parts by mass |
| Pigment (solid content) | 1 part by mass |
| (Pro-jet Black APD1000) | |
| Surfactant (solid content) (Surfynol 104) | 1 part by mass |
| Tetraethylene Glycol | 35 parts by mass |
| Crosslinking Agent (solid content) | 5 parts by mass |
| Water | 53 parts by mass |

As the crosslinking agent, ELASTRON BN-77 (manufactured by DKS Co. Ltd.) was used in the printing inkjet ink 55b, and E-05 (manufactured by Nisshinbo Chemical Inc.) was used in the printing inkjet ink 56b.

[Evaluation]

The printing inkjet inks 1b to 56b and R1b to R3b obtained as above were filtered through a polytetrafluoroethylene (PTFE) membrane filter (pore diameter: 1 μm), and then evaluation was performed as follows. The results thereof are shown in Tables 18 and 19.

—Inkjet Printing—

An ink cartridge was filled with the printing inkjet ink obtained as above, an image was recorded on a pretreated cotton fabric (cotton broadcloth 40, manufactured by Shikisensha CO., LTD.) using an inkjet printer (PX-045A, manufactured by Seiko Epson Corporation), and the ink was fixed by a heating treatment. Whereby, a colored fabric was obtained.

Pretreatment

Cation Master PD-7 (containing coagulating agent, manufactured by Yokkaichi Chemical Company, Limited., solid content 50 mass %) (50 parts by mass), BYK348 (manufactured by BYK JAPAN KK) (5 parts by mass), glycerin (100 parts by mass), and water (845 parts by mass) were mixed and stirred to prepare an aqueous pretreatment liquid.

The aqueous pretreatment liquid prepared as above was squeezed out onto a cotton fabric (cotton broadcloth 40, manufactured by Shikisensha CO., LTD.) by a padding method with a squeezing ratio of 70%, and dried for 24 hours. The squeezing ratio (%) represents the residual amount (mass ratio) of the aqueous treatment liquid with respect to the fabric after squeezing the fabric including the aqueous treatment liquid.

Heating Treatment

The obtained colored fabric was dried at 20° C. for 12 hours, and then heated at 160° C. for 60 seconds using a heat press (desktop automatic flat press AF-54TEN, manufactured by Asahi Textile Machinery Co., Ltd.) to fix the ink.

<Color Developability>

The color developability was evaluated according to the following criteria. Black and colors other than black were evaluated as follows.

Other than Black (Cyan, Magenta; Examples 50b to 52b):

Evaluation was performed according to the following criteria with a saturation C value calculated from brightness (L*) and chromaticity (a*, b*) when an optical density (OD) value was 1.0.

A: L*>50 and C>40

B: L*>40 and 30<C≤40, or 40<L*≤50 and C>30

C: L*>30 and 20<C≤30, or 30<L*≤40 and C>20

D: L*≤30, or C≤20

Black (black; Examples 1b to 49b, 53b to 56b, Comparative Examples 1b to 3b):

Evaluation was performed according to the following criteria with an OD value.

SSS: The OD value is 1.7 or greater.

SS: The OD value is 1.6 or greater and less than 1.7.

S: The OD value is 1.4 or greater and less than 1.6.
A: The OD value is 1.2 or greater and less than 1.4.
B: The OD value is 1.0 or greater and less than 1.2.
C: The OD value is 0.8 or greater and less than 1.0.
D: The OD value is less than 0.8.

<Ink Storage Stability 2>

The printing inkjet ink stored at room temperature within 1 day after the preparation was sealed in a container and left at 60° C. for two weeks. With the ink after two weeks had elapsed, inkjet printing was performed by the above-described method to obtain a colored fabric. The obtained colored fabric was subjected to color developability evaluation, and the storage stability of the ink was evaluated according to the same evaluation criteria.

<Washing Resistance>

Evaluation was performed based on JIS L-0844 A-2 (revised in 2011). The evaluation result of washing resistance indicates that the larger the value, the better the fastness.

<Perspiration Resistance>

Evaluation was performed based on JIS L-0848 (revised in 2004). The evaluation result of perspiration resistance indicates that the larger the value, the better the fastness.

<Rub Resistance>

Evaluation was performed based on JIS L-0849 Type II (revised in 2013). The evaluation result of rub resistance indicates that the larger the value, the better the fastness.

<Dry cleaning Resistance>

Evaluation was performed based on JIS L-0860 A-1 method (revised in 2008). The evaluation result of dry cleaning resistance indicates that the larger the value, the better the fastness.

TABLE 18

| | | | Evaluation Results | | | | | | |
| | Printing Inkjet Ink | Colored Resin Particle Dispersion | Color Developability | Storage Stability 2 | Washing Resistance | Perspiration Resistance Acid | Perspiration Resistance Alkali | Rub Resistance Dry | Rub Resistance Wet | My Cleaning Resistance |
|---|---|---|---|---|---|---|---|---|---|---|
| Example 1b | 1b | Dispersion 1 | S | A | 4 | 4 | 4 | 4 | 3-4 | 4 |
| Example 2b | 2b | Dispersion 2 | S | A | 4 | 4 | 4 | 4 | 3-4 | 4 |
| Example 3b | 3b | Dispersion 3 | S | A | 4 | 4 | 4 | 4 | 3-4 | 4 |
| Example 4b | 4b | Dispersion 4 | S | A | 4 | 4 | 4 | 4 | 3-4 | 4 |
| Example 5b | 5b | Dispersion 5 | S | A | 4 | 4 | 4 | 4 | 3-4 | 4 |
| Example 6b | 6b | Dispersion 6 | S | A | 4 | 4 | 4 | 4 | 3-4 | 5 |
| Example 7b | 7h | Dispersion 7 | S | A | 4 | 4 | 4 | 4 | 3-4 | 5 |
| Example 8b | 8b | Dispersion 8 | S | A | 4 | 4 | 4 | 4 | 3-4 | 4 |
| Example 9b | 9b | Dispersion 9 | S | A | 4 | 4 | 4 | 4 | 3-4 | 4 |
| Example 10b | 10b | Dispersion 10 | S | A | 4 | 4 | 4 | 4 | 3-4 | 4 |
| Example 11b | 11b | Dispersion 11 | S | S | 5 | 5 | 5 | 5 | 4-5 | 5 |
| Example 12b | 12b | Dispersion 12 | S | A | 4 | 4 | 4 | 4 | 3-4 | 4 |
| Example 13b | 13b | Dispersion 13 | S | A | 4 | 4 | 4 | 4 | 3-4 | 4 |
| Example 14b | 14b | Dispersion 14 | S | A | 4 | 4 | 4 | 4 | 3-4 | 4 |
| Example 15b | 15b | Dispersion 15 | S | A | 4 | 4 | 4 | 4 | 3-4 | 4 |
| Example 16b | 16b | Dispersion 16 | S | A | 4 | 4 | 4 | 4 | 3-4 | 4 |
| Example 17b | 17b | Dispersion 17 | S | A | 4 | 4 | 4 | 4 | 3-4 | 4 |
| Example 18b | 18b | Dispersion 18 | S | A | 4 | 4 | 4 | 4 | 3-4 | 4 |
| Example 19b | 19b | Dispersion 19 | S | A | 4 | 4 | 4 | 4 | 3-4 | 4 |
| Example 20b | 20b | Dispersion 20 | S | A | 4 | 4 | 4 | 4 | 3-4 | 4 |
| Example 21b | 21b | Dispersion 21 | S | S | 5 | 5 | 5 | 5 | 4-5 | 5 |
| Example 22b | 22b | Dispersion 22 | S | S | 5 | 5 | 5 | 5 | 4-5 | 5 |
| Example 23b | 23b | Dispersion 23 | S | S | 5 | 5 | 5 | 5 | 4-5 | 5 |
| Example 24b | 24b | Dispersion 24 | S | S | 5 | 5 | 5 | 5 | 4-5 | 5 |
| Example 25b | 25b | Dispersion 25 | S | S | 5 | 5 | 5 | 5 | 4-5 | 5 |

TABLE 18-continued

| | Printing Inkjet Ink | Colored Resin Particle Dispersion | Color Developability | Storage Stability 2 | Washing Resistance | Perspiration Resistance Acid | Perspiration Resistance Alkali | Rub Resistance Dry | Rub Resistance Wet | My Cleaning Resistance |
|---|---|---|---|---|---|---|---|---|---|---|
| Example 26b | 26b | Dispersion 26 | S | S | 5 | 5 | 5 | 5 | 4-5 | 5 |
| Example 27b | 27b | Dispersion 27 | S | S | 5 | 5 | 5 | 5 | 4-5 | 5 |
| Example 28b | 28b | Dispersion 28 | S | S | 5 | 5 | 5 | 5 | 4-5 | 5 |
| Example 29b | 29b | Dispersion 29 | S | S | 5 | 5 | 5 | 5 | 4-5 | 5 |
| Example 30b | 30b | Dispersion 30 | S | S | 5 | 5 | 5 | 5 | 4-5 | 5 |

TABLE 19

| | Printing Inkjet Ink | Colored Resin Particle Dispersion | Color Developability | Storage Stability 2 | Washing Resistance | Perspiration Resistance Acid | Perspiration Resistance Alkali | Rub Resistance Dry | Rub Resistance Wet | Dry Cleaning Resistance |
|---|---|---|---|---|---|---|---|---|---|---|
| Example 31b | 31b | Dispersion 31 | S | S | 5 | 5 | 5 | 5 | 4-5 | 5 |
| Example 32b | 32b | Dispersion 32 | S | S | 5 | 5 | 5 | 5 | 4-5 | 5 |
| Example 33b | 33b | Dispersion 33 | S | S | 5 | 5 | 5 | 5 | 4-5 | 5 |
| Example 34b | 34b | Dispersion 34 | S | S | 5 | 5 | 5 | 5 | 4-5 | 5 |
| Example 35b | 35b | Dispersion 35 | S | S | 5 | 5 | 5 | 5 | 4-5 | 5 |
| Example 36b | 36b | Dispersion 36 | S | S | 5 | 5 | 5 | 5 | 4-5 | 5 |
| Example 37b | 37b | Dispersion 37 | S | S | 5 | 5 | 5 | 5 | 4-5 | 5 |
| Example 38b | 38b | Dispersion 38 | S | A | 4 | 4 | 4 | 4 | 3-4 | 4 |
| Example 39b | 39b | Dispersion 39 | SS | SS | 5 | 5 | 5 | 5 | 4-5 | 5 |
| Example 40b | 40b | Dispersion 40 | SS | SS | 5 | 5 | 5 | 5 | 4-5 | 5 |
| Example 41b | 41b | Dispersion 41 | SS | SS | 5 | 5 | 5 | 5 | 4-5 | 5 |
| Example 42b | 42b | Dispersion 42 | SS | SS | 5 | 5 | 5 | 5 | 4-5 | 5 |
| Example 43b | 43b | Dispersion 43 | SS | SS | 5 | 5 | 5 | 5 | 4-5 | 5 |
| Example 44b | 44b | Dispersion 44 | SS | SS | 5 | 5 | 5 | 5 | 4-5 | 5 |
| Example 45b | 45b | Dispersion 45 | SS | SS | 5 | 5 | 5 | 5 | 4-5 | 5 |
| Example 46b | 46b | Dispersion 46 | SS | SS | 5 | 5 | 5 | 5 | 4-5 | 5 |
| Example 47b | 47b | Dispersion 47 | SSS | SSS | 5 | 5 | 5 | 5 | 4-5 | 5 |
| Example 48b | 48b | Dispersion 48 | SSS | SSS | 5 | 5 | 5 | 5 | 4-5 | 5 |
| Example 49b | 49b | Dispersion 49 | SSS | SSS | 5 | 5 | 5 | 5 | 4-5 | 5 |
| Example 50b | 50b | Dispersion 50 | A | A | 5 | 5 | 5 | 5 | 4-5 | 5 |
| Example 51b | 51b | Dispersion 51 | A | A | 5 | 5 | 5 | 5 | 4-5 | 5 |
| Example 52b | 52b | Dispersion 52 | A | A | 5 | 5 | 5 | 5 | 4-5 | 5 |
| Example 53b | 53b | Dispersion 3 | S | A | 5 | 5 | 5 | 5 | 4-5 | 5 |
| Example 54b | 54b | Dispersion 3 | S | A | 5 | 5 | 5 | 5 | 4-5 | 5 |
| Example 55b | 55b | Dispersion 3 | S | A | 5 | 5 | 5 | 5 | 4-5 | 5 |
| Example 56b | 56b | Dispersion 3 | S | A | 5 | 5 | 5 | 5 | 4-5 | 5 |
| Comparative Example 1b | R1b | Dispersion R1 | B | C | 3 | 3 | 3 | 3 | 2-3 | 3 |
| Comparative Example 2b | R2b | Dispersion R2 | D | D | 2 | 2 | 2 | 2 | 2 | 2 |
| Comparative Example 3b | R3b | Dispersion R3 | B | B | 4 | 4 | 4 | 4 | 3-4 | 4 |

The inks according to the embodiment of the present invention had excellent storage stability, and made it possible to obtain a colored fabric having excellent color developability, washing resistance, perspiration resistance, rub resistance, and dry cleaning resistance.

In contrast, in Comparative Example 1b in which the polymer in the colored resin particles did not have a cyclic structure, it was difficult to hold the dye at a high concentration, and the results were poor in all the evaluation items. In Comparative Example 3b in which the polymer had a crosslinking structure, the polymer had a poor affinity for the dye, and as a result, the dye holding property was poor, and the color developability and the storage stability of the ink were thus poor. In Comparative Example 2a in which the polymer was water-soluble, the dye holding property was at the lowest level, and the results were poor in all the evaluation items.

Example 1c (Preparation of Printing Inkjet Ink 1c)

A printing inkjet ink 1c was prepared by mixing components of the following composition.

—Composition of Printing Inkjet Ink—

| | |
|---|---|
| Dispersion 1 (solid content) | 13 parts by mass |
| Surfactant (solid content) | 1 part by mass |

-continued

| | |
|---|---|
| TetraethyleneGlycol | 35 parts by mass |
| Water | 51 parts by mass |

As the surfactant, Surfynol 104 (manufactured by Nissin Chemical Co., Ltd.) was used.

Examples 10c, 38c to 41c, and 61c to 68c

Printing inkjet inks 10c, 38c to 41c, and 61c to 68c were prepared in the same manner as in the case of the printing inkjet ink 1c, except that the dispersion 1 was changed to the dispersions shown in the following Table 20, respectively.

[Evaluation]

The printing inkjet inks 1c, 10c, 38c to 41c, and 61c to 68c were filtered through a polytetrafluoroethylene (PTFE) membrane filter (pore diameter: 1 μm), and then inkjet printing and evaluation were performed in the same manner as in the case of the printing inkjet inks 1b to 56b described above. The results thereof are shown in Table 20.

TABLE 20

| Printing Inkjet Ink | Colored Resin Particle Dispersion | Evaluation Results | | | | | | | |
|---|---|---|---|---|---|---|---|---|---|
| | | Color Developability | Storage Stability 2 | Washing Resistance | Perspiration Resistance | | Rub Resistance | | Dry Cleaning Resistance |
| | | | | | Acid | Alkali | Dry | Wet | |
| Example 1c | Dispersion 1 | S | A | 4 | 4 | 4 | 4 | 3-4 | 4 |
| Example 10c | Dispersion 10 | S | A | 4 | 4 | 4 | 4 | 3-4 | 4 |
| Example 38c | Dispersion 38 | SS | SSS | 5 | 5 | 5 | 5 | 4-5 | 5 |
| Example 39c | Dispersion 39 | SS | SSS | 5 | 5 | 5 | 5 | 4-5 | 5 |
| Example 40c | Dispersion 40 | SS | SSS | 5 | 5 | 5 | 5 | 4-5 | 5 |
| Example 41c | Dispersion 41 | SS | SSS | 5 | 5 | 5 | 5 | 4-5 | 5 |
| Example 61c | Dispersion 61 | SSS | SSS | 5 | 5 | 5 | 5 | 4-5 | 5 |
| Example 62c | Dispersion 62 | SSS | SSS | 5 | 5 | 5 | 5 | 4-5 | 5 |
| Example 63c | Dispersion 63 | SSS | SSS | 5 | 5 | 5 | 5 | 4-5 | 5 |
| Example 64c | Dispersion 64 | SSS | SSS | 5 | 5 | 5 | 5 | 4-5 | 5 |
| Example 65c | Dispersion 65 | SSS | SSS | 5 | 5 | 5 | 5 | 4-5 | 5 |
| Example 66c | Dispersion 66 | S | A | 4 | 4 | 4 | 4 | 3-4 | 4 |
| Example 67c | Dispersion 67 | S | A | 4 | 4 | 4 | 4 | 3-4 | 4 |
| Example 68c | Dispersion 68 | S | A | 4 | 4 | 4 | 4 | 3-4 | 4 |

From the results shown in Table 20, it has been found that in a case where the printing inkjet inks 61c to 68c are used, the color developability and the storage stability are particularly excellent.

Examples IS-1 to IS-5 and Comparative Example IS-1C

[Preparation of Inkjet Ink (Qm)]
(Preparation of Pigment Dispersion Liquid)

3 g of a styrene-acrylic acid copolymer (JONCRYL 678, manufactured by BASF SE, trade name), 1.3 g of dimethylaminoethanol, and 80.7 g of ion exchange water were stirred and mixed at 70° C. Next, 15 g of C. I. Pigment Red 112 and 50 vol % zirconia beads having a particle diameter of 0.5 mm were filled and dispersed using a sand grinder mill to obtain a pigment dispersion liquid in which the content of the pigment was 15 mass %.

(Preparation of Aqueous Binder)

50 g of 2-butanone was put into a three-neck flask, and the internal temperature was increased to 75° C. A mixture of 80 g of n-butyl methacrylate, 20 g of acrylic acid, 50 g of 2-butanone, and 0.5 g of azoisobutyronitrile was added dropwise thereto for 3 hours. After the dropwise addition, the mixture was heated under reflux for 5 hours, cooled to room temperature, and heated under reduced pressure to obtain a residue of a polymer. 350 mL of ion exchange water and a 1.05-fold molar amount of sodium hydroxide of acrylic acid added as a monomer were added thereto, and then dissolved. The mixture was diluted with ion exchange water such that the total amount was 500 g to obtain a 20 mass % aqueous solution of an aqueous binder.

(Preparation of Pigment Ink)

46.6 g of the above pigment dispersion liquid, 15 g of the above 20 mass % aqueous solution of the aqueous binder, 2.9 g of PDX-7664A (manufactured by BASF SE, trade name), 10 g of triethylene glycol monobutyl ether, 5 g of 1,2-hexanediol, 11.2 g of diethylene glycol, and 0.6 g of OLEFIN 465 (manufactured by Nissin Chemical Co., Ltd., trade name) were mixed, and ion exchange water was added thereto to prepare a total amount of 100 g. The mixture was filtered through a 0.8 μm filter to obtain an inkjet ink (Qm). The inkjet ink (Qm) is a magenta ink.

[Preparation of Inkjet Ink (Qc)]

An inkjet ink (Qc) was prepared in the same manner as in the preparation of the inkjet ink (Qm), except that C. I. Pigment Blue 15: 4 was used instead of C. I. Pigment Red 112. The inkjet ink (Qc) is a cyan ink.

[Preparation of Inkjet Ink (Qy)]

An inkjet ink (Qy) was prepared in the same manner as in the preparation of the inkjet ink (Qm), except that C. I. Pigment yellow 180 was used instead of C. I. Pigment Red 112. The inkjet ink (Qy) is a yellow ink.

[Preparation of Inkjet Ink (Qb)]

An inkjet ink (Qb) was prepared in the same manner as in the preparation of the inkjet ink (Qm), except that carbon black was used instead of C. I. Pigment Red 112. The inkjet ink (Qb) is a black ink.

[Preparation of Inkjet Printing Ink Set]

Inkjet printing ink sets S1 to S5 and X1 were prepared with the combinations of the inkjet inks shown in the following Table 21.

(Ink Set Evaluation Method)

(Preparation of Aqueous Pretreatment Liquid Containing Coagulating Agent)

Cation Master PD-7 (containing coagulating agent; manufactured by Yokkaichi Chemical Company, Limited., solid content 50 mass %) (50 parts by mass), BYK348 (manufactured by BYK JAPAN KK) (5 parts by mass), glycerin (100 parts by mass), and water (845 parts by mass) were mixed and stirred to prepare an aqueous pretreatment liquid.

(Pretreatment Step)

The aqueous pretreatment liquid prepared as above was squeezed out onto each of a polyester fabric (POLYESTER TROPICAL (manufactured by TEIJIN LIMITED), manufactured by Shikisensha CO., LTD., product code A02-01019), a cotton fabric (cotton broadcloth, mercerized, manufactured by Shikisensha CO., LTD., product code A02-01002), and a 65% polyester-35% cotton blend fabric (blended polyester 65/cotton 35 broad, manufactured by Shikisensha CO., LTD., product code A02-01030) by a padding method with a squeezing ratio of 70%, and dried for 24 hours. The squeezing ratio (%) represents the residual amount (mass ratio) of the aqueous treatment liquid with respect to the fabric after squeezing the fabric including the aqueous treatment liquid.

(Inkjet Printing, Heating Treatment, and Evaluation)

The inkjet printing ink sets S1 to S5 and X1 were loaded in an ink cartridge. Images were printed on a polyester fabric (POLYESTER TROPICAL (manufactured by TEIJIN LIMITED), manufactured by Shikisensha CO., LTD., product code A02-01019) after the pretreatment step, a cotton fabric (cotton broadcloth, mercerized, manufactured by Shikisensha CO., LTD., product code A02-01002) after the pretreatment step, and a 65% polyester-35% cotton blend fabric (blended polyester 65/cotton 35 broad, manufactured by Shikisensha CO., LTD., product code A02-01030) after the pretreatment step, respectively, using an inkjet printer (COLORIO PX-045A manufactured by Seiko Epson Corporation, trade name), and dried at room temperature for 12 hours. After the drying, a heat treatment was performed at a temperature of 200° C. under a pressure of 0.20 N/cm$^2$ for 60 seconds using a heat press (manufactured by Asahi Textile Machinery Co., Ltd., trade name: desktop automatic flat press AF-54TEN) to obtain colored fabrics.

Image clarity evaluation was performed as follows on the obtained colored fabrics.

[Image Clarity]

Sensory evaluation by visual observation was carried out. Evaluation was performed in four stages: A for the case where all three types of fabrics exhibit a clear image, B for the case where two types of fabrics exhibit a clear image, C for the case where only one type of fabric exhibits a clear image, and D for the case where there is no clear image. The results thereof are shown in Table 21.

TABLE 21

|  | Example IS-1 | Example IS-2 | Example IS-3 | Example IS-4 | Example IS-5 | Comparative Example IS-1C |
|---|---|---|---|---|---|---|
| Inkjet Printing Ink Set | S1 | S2 | S3 | S4 | S5 | X1 |
| Magenta Ink | (Qm) | Printing Inkjet Ink 52b | (Qm) | Printing Inkjet Ink 52b | Printing Inkjet Ink 52b | (Qm) |
| Yellow Ink | (Qy) | (Qy) | (Qy) | (Qy) | (Qy) | (Qy) |
| Cyan Ink | (Qc) | (Qc) | Printing Inkjet Ink 51b | Printing Inkjet Ink 51b | Printing Inkjet Ink 51b | (Qc) |
| Black Ink | Printing Inkjet Ink 3b | Printing Inkjet Ink 3b | Printing Inkjet Ink 3b | Printing Inkjet Ink 3b | (Qb) | (Qb) |
| Pretreatment with Coagulating Agent | Pretreated | Pretreated | Pretreated | Pretreated | Pretreated | Pretreated |
| Image Clarity | B | A | A | A | B | D |

In a case where the ink sets containing the printing inkjet ink according to the embodiment of the present invention were used, excellent image clarity was obtained.

According to the present invention, it is possible to provide: a colored resin particle dispersion which can be used to manufacture an ink which is capable of forming, on a fabric, an image having excellent color developability, washing resistance, perspiration resistance, rub resistance, and dry cleaning resistance, and on a plastic base material, an image having excellent color developability, pencil hardness, and adhesiveness to the base material, and has excellent jetting stability and storage stability; an ink manufactured using the colored resin particle dispersion; an ink set having the ink; an inkjet printing method using the ink; and a method of manufacturing the colored resin particle dispersion.

While the present invention has been described in detail and with reference to specific embodiments, it will be apparent to those skilled in the art that various changes and modifications can be made without departing from the spirit and scope of the present invention.

What is claimed is:

1. A colored resin particle dispersion comprising:
colored resin particles; and
water, wherein the colored resin particles contain a water-insoluble chain polymer and at least one dye selected from the group consisting of an oil-soluble dye, a disperse dye and a vat dye, and the water-insoluble chain polymer has a structure represented by the following General Formula (G), a cyclic structure, and a hydrophilic group, $$*-\underset{\underset{Rg}{|}}{N}-\underset{\underset{O}{\|}}{C}-Lg-* \qquad (G)$$

in the General Formula (G), Rg represents a hydrogen atom or a substituent, Lg represents —O—, —S—, or —NRz-, Rz represents a hydrogen atom or a substituent, and * represents a bonding position.

2. The colored resin particle dispersion according to claim 1,
wherein the water-insoluble chain polymer has at least one structural unit selected from a structural unit represented by the following General Formula (1) and a structural unit represented by the following General Formula (2), $$*1-\underset{\underset{O}{\|}}{C}-NH-Cy^1-NH-\underset{\underset{O}{\|}}{C}-*1 \qquad (1)$$

$$*2-Y^1-Cy^2-Y^2-*2 \qquad (2)$$

in the General Formulae (1) and (2),
$Cy^1$ and $Cy^2$ each independently represent a divalent organic group containing a cyclic structure, $Y^1$ and $Y^2$ each independently represent —O—, —S—, or —NRz-, Rz represents a hydrogen atom or a substituent, and *1 and *2 each represent a bonding position.

3. The colored resin particle dispersion according to claim 2,
wherein a total amount of at least one kind of the structural unit selected from the group consisting of the structural unit represented by the General Formula (1) and the structural unit represented by the General Formula (2) is 15 mass % or greater with respect to a total amount of the water-insoluble chain polymer.

4. The colored resin particle dispersion according to claim 1,
wherein a total amount of substance of the cyclic structure in 1 g of the water-insoluble chain polymer is 0.7 mmol/g or greater.

5. The colored resin particle dispersion according to claim 2,
wherein at least one of $Cy^1$ or $Cy^2$ contains three or more rings.

6. The colored resin particle dispersion according to claim 1,
wherein the water-insoluble chain polymer has a polymerizable group.

7. The colored resin particle dispersion according to claim 1,
wherein the dye is the oil-soluble dye.

8. The colored resin particle dispersion according to claim 7,
wherein the oil-soluble dye has two azo groups.

9. The colored resin particle dispersion according to claim 7,
wherein the oil-soluble dye contains a metal complex or a compound represented by the following General Formula (M-A), $$(M\text{-}A)$$

in the General Formula (M-A), $R^1$ to $R^{20}$ each independently represent a hydrogen atom or a substituent.

10. The colored resin particle dispersion according to claim 9,
wherein the oil-soluble dye contains chromium.

11. The colored resin particle dispersion according to claim 1,
wherein a mass ratio of a content of the water-insoluble chain polymer to a content of the dye is 0.1 to 2.5.

12. The colored resin particle dispersion according to claim 1,
wherein the mass ratio of the content of the water-insoluble chain polymer to the content of the dye is 0.25 to 1.

13. The colored resin particle dispersion according to claim 1,
wherein the colored resin particles contain an oily organic solvent.

14. The colored resin particle dispersion according to claim 13,
wherein a boiling point of the oily organic solvent is 180° C. or higher.

15. An ink comprising:
the colored resin particle dispersion according to claim 1.

16. The ink according to claim 15, further comprising:
a pigment.

17. An ink set comprising:
a black ink;
a yellow ink;
a magenta ink; and
a cyan ink,
wherein at least one ink of the ink set is the ink according to claim 15.

18. An inkjet printing method comprising:
a step of printing the ink according to claim 15 on a fabric by an inkjet method.

19. The inkjet printing method according to claim 18,
wherein the fabric is a fabric pretreated with an aqueous pretreatment liquid containing a coagulating agent.

20. A method of manufacturing a colored resin particle dispersion containing colored resin particles and water,
the colored resin particles containing a water-insoluble chain polymer and at least one dye selected from the group consisting of an oil-soluble dye, a disperse dye and a vat dye, the water-insoluble chain polymer having a structure represented by the following General Formula (G), a cyclic structure, and a hydrophilic group, and the method comprising:
   a step (1); and
   a step (2), wherein the step (1) is a step of obtaining an emulsion by emulsifying a mixture containing water, an organic solvent, a water-insoluble chain polymer having a structure represented by the General Formula (G), a cyclic structure and a hydrophilic group, and at least one dye selected from the group consisting of an oil-soluble dye, a disperse dye and a vat dye, the step (2) is a step of removing the organic solvent from the emulsion obtained in the step (1), and a mass ratio of a content of the water-insoluble chain polymer to a content of the dye in the mixture of the step (1) is 0.1 to 2.5,

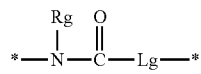
(G)

in the General Formula (G), Rg represents a hydrogen atom or a substituent, Lg represents —O—, —S—, or —NRz-, Rz represents a hydrogen atom or a substituent, and * represents a bonding position.

* * * * *